United States Patent
Thappla

(10) Patent No.: US 11,295,098 B1
(45) Date of Patent: Apr. 5, 2022

(54) SMART DRIVER CARD DEVICE AND DRIVER DATA AND TRAFFIC MANAGEMENT SYSTEM

(71) Applicant: Dev Kumar Thappla, Parkland, FL (US)

(72) Inventor: Dev Kumar Thappla, Parkland, FL (US)

( * ) Notice: Subject to any disclaimer, the term of this patent is extended or adjusted under 35 U.S.C. 154(b) by 0 days.

(21) Appl. No.: 16/942,360

(22) Filed: Jul. 29, 2020

Related U.S. Application Data

(60) Provisional application No. 62/880,047, filed on Jul. 29, 2019.

(51) Int. Cl.
  *G07B 15/02* (2011.01)
  *G06K 7/10* (2006.01)
  *G06Q 40/08* (2012.01)
  *G06K 19/07* (2006.01)

(52) U.S. Cl.
  CPC ..... *G06K 7/10366* (2013.01); *G06K 19/0723* (2013.01); *G06Q 40/08* (2013.01)

(58) Field of Classification Search
  CPC ............... G06Q 20/12; G06Q 20/3674; G06Q 20/4014; G06Q 20/32; G06Q 20/3821; G07F 7/1008; G07F 7/025
  USPC .... 235/375, 380, 384; 705/1.1, 26.1, 39, 50, 705/59
  See application file for complete search history.

(56) References Cited

U.S. PATENT DOCUMENTS

2017/0032673 A1* 2/2017 Scofield ............... H04L 9/3247

* cited by examiner

*Primary Examiner* — Jamara A Franklin
(74) *Attorney, Agent, or Firm* — David P. Lhota, Esq.; Lhota & Associates, P.A.

(57) ABSTRACT

A smart driver card device and data management system that includes a card and reader that facilitates both people and traffic officials to accumulate, fetch driver and vehicle details, such as driver license, vehicle registration, and insurance documents, through a wireless medium; allows authorized persons, such as users, to store additional information about their medical insurance and benefits, health issue history, their recent check-up details, and related or similar information; verifies data sets by an authorized administration personnel and stored in a centralized database; and provides users with complete authorization details to update their vehicle and medical data in a timely manner but are limited to certain documents. The smart driver card device and data management system includes a card and reader that facilitates both people and traffic officials to access driver and vehicle details, such as driver license, vehicle registration, and insurance documents; allows authorized persons to store medical insurance and benefits information, health issue history, recent medical details, and similar information; verifies data sets by an authorized administration personnel and stored in a centralized database; and provides users with complete authorization details to update their vehicle and medical data in a timely manner but are limited to certain documents.

20 Claims, 22 Drawing Sheets

10

10

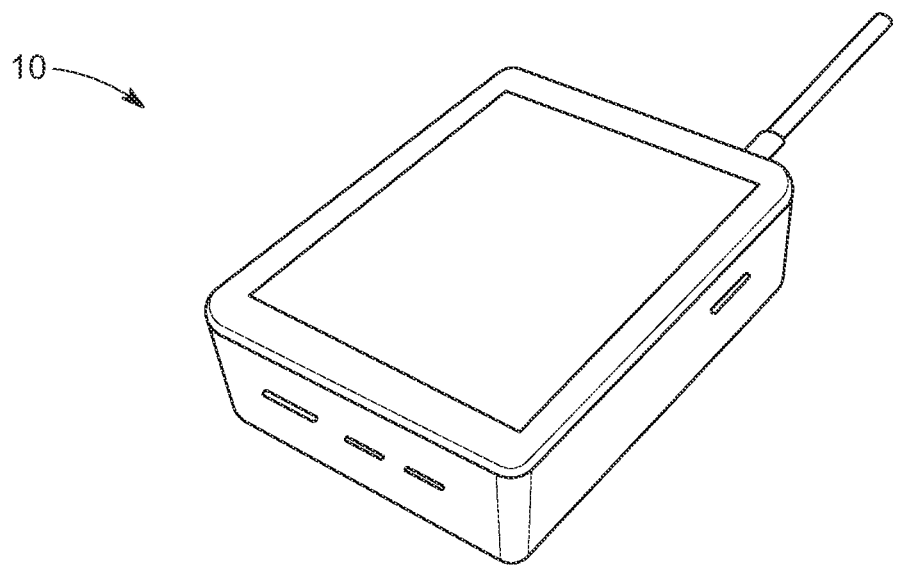
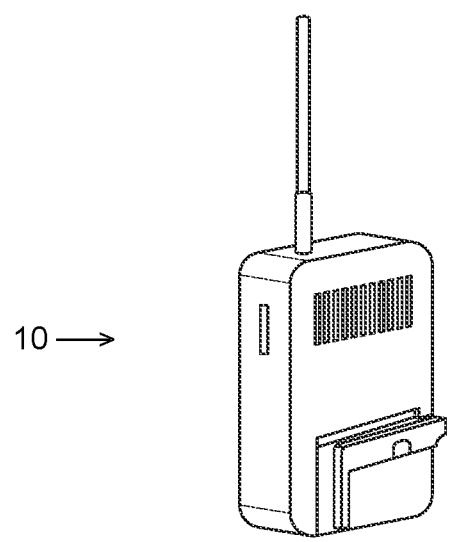
FIG. 28

SMART DRIVER CARD DEVICE AND DRIVER DATA AND TRAFFIC MANAGEMENT SYSTEM

CROSS-REFERENCE TO RELATED APPLICATION

This application claims the benefit of provisional patent application Ser. No. 62/880,047 filed Jul. 29, 2019.

STATEMENT REGARDING FEDERALLY SPONSORED RESEARCH OR DEVELOPMENT

N/A

FIELD OF THE INVENTION

The present invention relates to a smart driver and system, and in particular, to a smart driver card device and driver data and traffic management system including a card with digital driver related data, such as driver license, vehicle registration and health and vehicle insurance information, radiofrequency identification (RFID), near field communication (NFC), machine readable zone (MRZ), color QR code and biometrics and a wireless communication medium and web-based URL that facilitates civilians and traffic officials to accumulate, access and use such data for improved traffic management and response time.

BACKGROUND OF THE INVENTION

Smart cards are considered one of the most significant technological advances in the financial and business landscape. Initiated from banking, smart card applications have extended far beyond banking to retail, IT, admin, and traffic sector due to its flexibility in operation and miniature size. Smart cards are also used to easily identify and authenticate users' credentials and allow transactions to be processed in a user friendly, secure, and efficient manner. Though they have numerous advantages, the deployment of smart cards in traffic management is still at its developmental phase. For instance, legacy techniques lag in facilitating traffic personnel to retrieve data efficiently and wirelessly. There exists a need for a novel smart card system having a smart driving license and smart driving license reader that is designed to empower traffic authority members to extract individual driving data, vehicle details, and other driver related data, such as vehicle insurance and health insurance through a wireless medium in a digital format with a distance range of up to 100 m. In such a system, the information would need to remain private and secured so it can only be retrieved by the smart driving license reader. The third component of the smart car and card application should enable users to store their medical insurance details and healthcare conditions to assist emergency responders when they respond to accidents. Accordingly, this data should be able to be stored in a cloud enabled database through a unique URL which could be accessed or retrieved whenever and wherever required.

Driving licenses (DL) and multi-purpose documents are universally accepted and utilized throughout the world for personal identification. DL's and the like notify law enforcement staff about the ability of individuals to drive vehicles in that state or country while proof of registration authorizes the driver to operate various types of vehicles. These documents have typically been provided in the form of paper and photo ID formats. As such, some cardholders have been victims of theft and tampering issues. When this occurs, the driver must visit an authorized branch for card renewal. This can be tedious as separate documents are required for DL, vehicles registration, and insurance processes. Conventional paper-based DL's, insurance papers, vehicle registration documents and health records have also led to security issues wherein a fraudulent DL can be developed from a photocopy of documents used during driver verification purposes. In order to overcome security aspects and maintain authenticity, government organization introduced mobile driving cards and Electronic ID (EID) cards.

With mobile driving cards, authorization is typically achieved through a face detection technique. It's challenging to accomplish this process since some may accept to show their face, and some may not. It's also a time-consuming procedure, error-prone and has more chances of having technical issues due to poor connectivity. In addition, due to being battery powered, energy consumption is high. EID cards allow users with a digital way to access their driving license through web-based services, but people face drawbacks in remembering those passwords. Some are multifactor authenticated, which further adds complexity in retrieving or modifying the data. Smart ID cards with integrated chip were introduced to overcome the above-mentioned limitations along with achieving enhanced security, authentication, in a simplified manner.

A smart card is generally defined as a small, flexible plastic material embedded with a microprocessor, integrated chip (IC), to store, process, and retrieve data either through an online or offline method. It may be extensively used around the world for electronic payment transactions, information management, storage, and other useful applications. Smart cards may be the size of small credit card or customized as per the manufacturer requirements. A simple IC embedded smart card may indirectly acts as a data repository that allows users to store some amount of information, which is approximately a hundred times more than that of the conventional magnetic strip card. It also empowers project managers, employees, and foreman to exchange data amongst each other through a key chain or pocket card reader sized devices. Identification and authentication of the particular person can also be easily achieved. Though it has numerous advantages, it is still unclear about the complete potentiality of the smart card. Moreover, the growing trends and technologies are looking forward to a simplified, smart, and authentic means to store, and retrieve a massive amount of data efficiently.

Unfortunately, there are no known such smart driver card devices and driver data and traffic management systems known that adequately and effectively address the aforementioned shortcomings. Accordingly, there exists a need for a smart card or smart driver card device and driver data and traffic management system including a card with digital driver related data, such as driver license, vehicle registration and health and vehicle insurance information, that is operable on a wireless communication medium and web-based URL that allows civilians and traffic officials to accumulate, access and use such data for improved traffic management and response time. If there existed a smart driver card and data management system for simplifying, improving and streamlining traffic management and related data it would be well received. It is therefore desirable to have a smart driver card and system that satisfies these objectives. It is, therefore, to the effective resolution of the aforementioned problems and shortcomings of the prior art that the present invention is directed. The instant invention addresses this unfulfilled need in the prior art by providing a smart driver card device and system with a mobile app as embodied and contemplated by the instant invention disclosed herein.

SUMMARY OF THE INVENTION

In light of the foregoing, it is an object of the present invention to provide a novel smart card device and system having a smart driving license and smart driving license reader that is designed to empower traffic authority members to extract individual driving data, vehicle details, and other driver related data, such as vehicle insurance and health insurance through a wireless medium in a digital format.

It is also an object of the instant invention to provide a smart driver card device and data management system that is encrypted and secured from unauthorized access.

It is another object of the instant invention to provide a smart driver card and data management system that enables users to store their medical insurance details and healthcare conditions to assist emergency responders when they respond to accidents.

It is an additional object of the instant invention to provide a smart card or smart driver card device and driver data and traffic management system including a card with digital driver related data, such as driver license, vehicle registration and health and vehicle insurance information, that is operable on a wireless communication medium and web-based URL that allows civilians and traffic officials to accumulate, access and use such data for improved traffic management and response time.

It is yet an additional object of the instant invention to provide a smart driver card device and data management system including Bluetooth and Wi-Fi technology.

In accordance with one aspect, the present invention provides a smart driver card device and data management system including a card or similar device with a microchip, RFID, NFC, MRZ, color QR code and biometrics and a microcontroller board, reader, power, unique URL and wireless medium and components for wireless communication with authorities, medical personnel and facilities, first responders, traffic officials and similar agencies to upload, update, retrieve, process and transmit relevant data.

In another aspect, the present invention provides a smart driver card device and data management system that includes a card and reader that facilitates both people and traffic officials to accumulate, fetch driver and vehicle details, such as driver license, vehicle registration, and insurance documents, through a wireless medium; allows authorized persons, such as users, to store additional information about their medical insurance and benefits, health issue history, their recent check-up details, and related or similar information; verifies data sets by an authorized administration personnel and stored in a centralized database; and provides users with complete authorization details to update their vehicle and medical data in a timely manner but are limited to certain documents.

In an additional aspect, the present invention provides a smart driver card device and data management system that provides an efficient smartcard integrated with IC modules and sensors such as RFID, NFZ, MRZ, biometrics, and color QR code; a mobile application where the users are guided to the centralized database through unique URL and find options to either upload/update relevant details concerned to vehicle documents, driving license, medical insurance details, present healthcare conditions; a unique card reader corresponding to the smartcard, which will facilitate traffic officials to read data for evaluating their vehicle registration, and individual authorization to drive the vehicle; a data writer that writes data to the smart card during traffic violations; securely stores the personal data pertaining to medical and vehicle history using high-end security protocol and store it in a cloud database while providing access to genuine users and traffic officials through unique credentials; and provides a unique authentication protocol where the URL dynamically changes whenever the user goes for an update and will be stored in the internal database.

In accordance with these and other objects, which will become apparent hereinafter, the instant invention will now be described with particular reference to the accompanying drawings

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 28 are top and side perspective views of a 3D model of the smart card device and system in accordance with the instant invention.

DETAILED DESCRIPTION OF THE INVENTION

Figure 1:
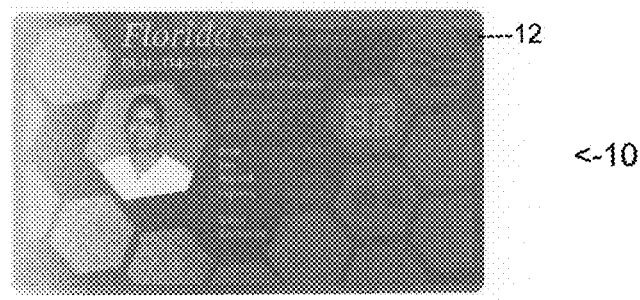
FIG. 1 is front elevational view of the smart driver card device of the system in accordance with the principles of the present invention.

With reference to the drawings in which like reference designators refer to like elements, FIGS. 1 to 30 depict the preferred and alternative embodiments of the instant invention which is generally referenced as a smart card or system, a smart card device or system, a smart driver card device or system and, or by numeric character 10. There is shown in FIGS. 1-30 the smart driver card device and system 10 of the instant invention with a mobile application ("app") in the form of software for mobile communication devices, such as iPhones, iPads, androids and the like, that provides advantages over conventional smart cards, driver licenses, insurance cards, vehicle documentation and the like. With reference to FIGS. 1-30, the smart driver card device and system 10 generally includes components identified by numerals 11-107 such as a card 12 or similar device with a microchip, RFID, NFC, MRZ, color QR code and biometrics and a microcontroller board 102, reader 105, AC or DC power 107, unique URL and wireless medium and components for wireless communication with authorities 1, medical personnel and facilities, first responders, traffic officials and similar agencies to upload, update, retrieve, process and transmit relevant data.

With reference to FIGS. 1-28, a smart card device 10 of the instant invention is shown which is used in the system 10 of the instant invention. Referring to FIGS. 1-28, the instant invention 10 is a novel smart card device and system 10 that includes a card and reader that facilitates both people and traffic officials to accumulate, fetch driver and vehicle details, such as driver license, vehicle registration, and insurance documents, through a wireless medium. The card and system 10 also allow authorized persons, such as users, to store additional information about their medical insurance and benefits, health issue history, their recent check-up details, and related or similar information. These data sets are verified by the authorized administration personnel and stored in a centralized database. Users are also provided with complete authorization details to update their vehicle and medical data in a timely manner but are limited to certain documents. The detailed working procedure is further explained and described herein as follows.

The instant invention 10 provides a unique smart card technology that is implemented with advanced tools, technology, and strong multifactor authentication protocol(s). The smart card device 10 is comparatively miniature in size, capable of storing multiple documents such as DL, vehicle registration and insurance details, and personal health insurance details, and acts as a source of the data carrier. These documents can also be accessed by traffic personnel's through an authorized device within the distance range of 100 m. Individuals can update their documents either through web-based or smart mobile application, e.g. a mobile App. Additionally, the system 10 includes a unique smart card reader developed to ensure driver's privacy though encryption and to facilitate traffic officials in sensing and retrieving the smart card data from short distance to longer distances up to 100 m through a wireless medium.

Referring to FIGS. 1-30, the smart card device and system 10 provides an efficient smartcard integrated with IC modules and sensors such as RFID, NFZ, MRZ, biometrics, and color QR code. It provides a mobile application where the users are guided to the centralized database through unique URL and find options to either upload/update relevant details concerned to vehicle documents, driving license, medical insurance details, present healthcare conditions. The instant invention 10 provides a unique card reader corresponding to the smartcard, which will facilitate traffic officials to read data for evaluating their vehicle registration, and individual authorization to drive the vehicle. Write data to the smart card during traffic violations. The smart card device and system 10 securely store the personal data pertaining to medical and vehicle history using high-end security protocol and store it in a cloud database while providing access to genuine users and traffic officials through unique credentials. The instant invention 10 provides a unique authentication protocol where the URL dynamically changes whenever the user goes for an update and will be stored in the internal database.

Figure 6:
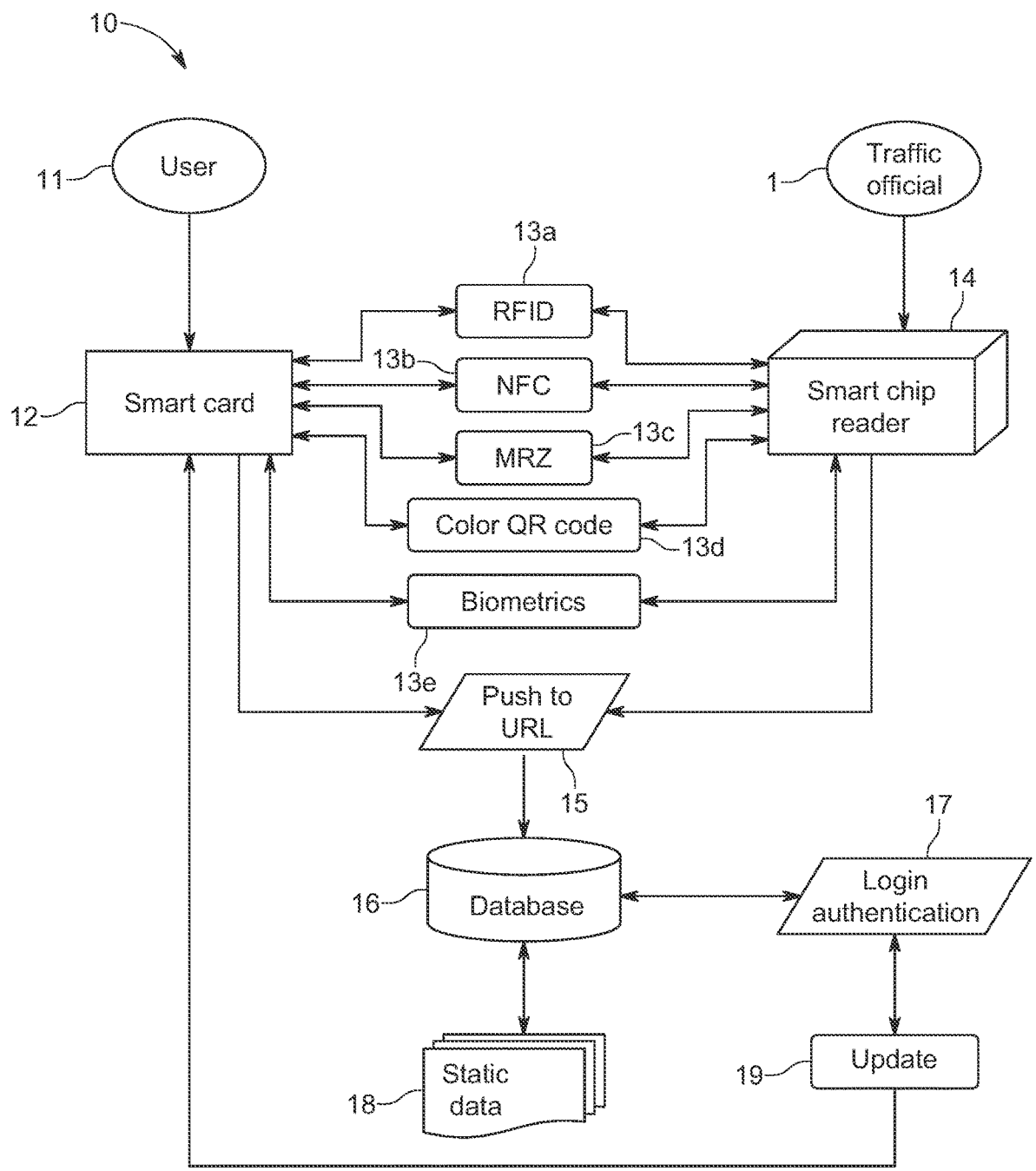
FIG. 6 is a block diagram of the smart chip configuration and reader module in accordance with the instant invention.

Still referring to the drawings, the block diagram of the proposed system along with various components used in the project and its integration is shown in FIG. 6. A person who has applied for driving license is provided with a smart card device 10, which includes Radiofrequency (RFID), Near Field Communication (NFC), Machine Readable Zone (MRZ), color QR code, and biometrics. These components are embedded with a web-based URL through which an individual can store data concerned to his vehicle registration details, captures and transmit information in real-time to determine his location, and other additional data sources. The mobile application (App) is designed as a core part of the entire system. In order to upload or update the details, the person has to download the mobile app developed in correspondence to the smart card device 10.

The smart card 10 is placed behind the phone to scan the unique URL, which leads to the cloud-enabled database where they can store the input data. The input data will be stored in the form of PDF format. This data can be retrieved, or monitored through the unique mobile based App, or the web, or smart card reader machines.

The smart card reader of the instant invention 10 is embedded with components that sense and read the DL information transmit it to traffic officials to retrieve complete details about the driver and the vehicle. The entire process is carried out through a wireless medium. Along with data sensing, individuals as well as traffic officials are provided with unique credentials to rewrite or upgrade the static data, during any misuse, or accidental damage, or rule violation cases. Additionally, a well-versed and trusted administrator from the government may allowed to validate the documents submitted during traffic violations.

The rapid increase in healthcare data has put forth some new challenges to achieve efficient medical data integrity and security. The smart card techniques of the instant invention 10 can overcome these drawbacks by allowing users to store, and retrieve data through mobile applications, achieve high-end security and authentication to safeguard and distribute the medical data.

Figure 2:
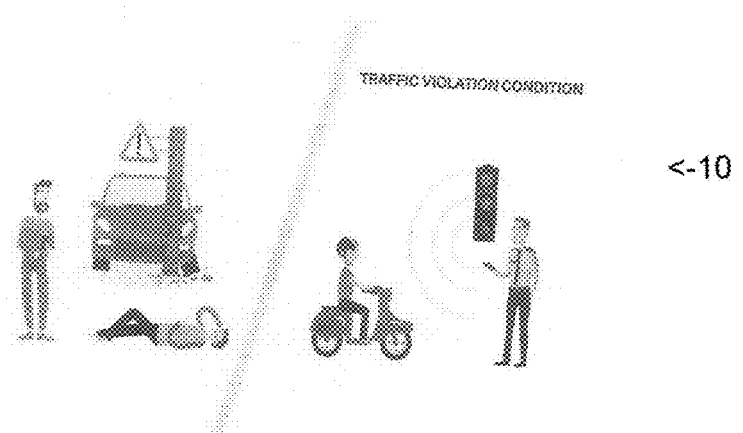
FIG. 2 provides a front elevational working principle visualization of the smart card device and system as used in accordance with the instant invention.

The major benefits of the smart card system 10 are as follows. The smart card system 10 provides a rapid, flexible, and precise mode of determining valid documents. It provides an easy and safe process to issue tickets during traffic stops for violations as traffic personnel will be able to retrieve all pertinent information prior to physically getting out of their vehicle to approach the driver. The instant invention 10 has minimal fraudulent factor capture by deploying high-end authentication protocol for safeguarding provider information and data. The smart card system 10 provides rapid deployment of medical information in cases of injury. The invention 10 provides a convenient and user-friendly method to transfer, store, or carry data. The smart driver card and system 10 reduces paperwork and record maintenance cost. The smart card and system 10 provide user-friendly access for traffic authorities as they are able to detect and validate DL from a longer distance of 100 m. The key features of the smart card technology can be understood by considering two case studies as shown in FIG. 2. The brief case studies are as follows:

With reference to FIG. 2, in Case 1: Accidental condition: During this case, if the person having our smart card meets with an accident, then the authorized person in the line of sight can access it either through scanning procedure or wireless medium via our reader. Retrieve personal health and contact details, share with emergency medical personnel and inform their relatives/emergency contacts about the incident.

Still referring to FIG. 2, in Case 2: Traffic violation condition: Traffic officials can effectively retrieve the driver's data through card reader with 100 m and issue tickets for traffic violation cases.

With respect to these case studies and others, the instant invention 10 includes smart card software security that ensures confidentiality, data integrity, and security over the data transferred through the smart card and reader module. It provides smart card operating systems with a unique, customized, and user-friendly software OS that is developed in the proposed system and in smart card file systems. The smart card communications provide a long-range communication of up to 100 m is achieved through the proposed method. The smart card hardware of the instant invention 10 is custom designed, integrated with various sensors to store a smart part of data, has guides to the website through the unique URL, and allows the reader to sense the card from a long distance. The instant invention 10 includes a smart card memory system, smart card CPU, smart card input/output (I/O), smart card system design, data security, data integrity, and smart card system architectures.

Figure 3:
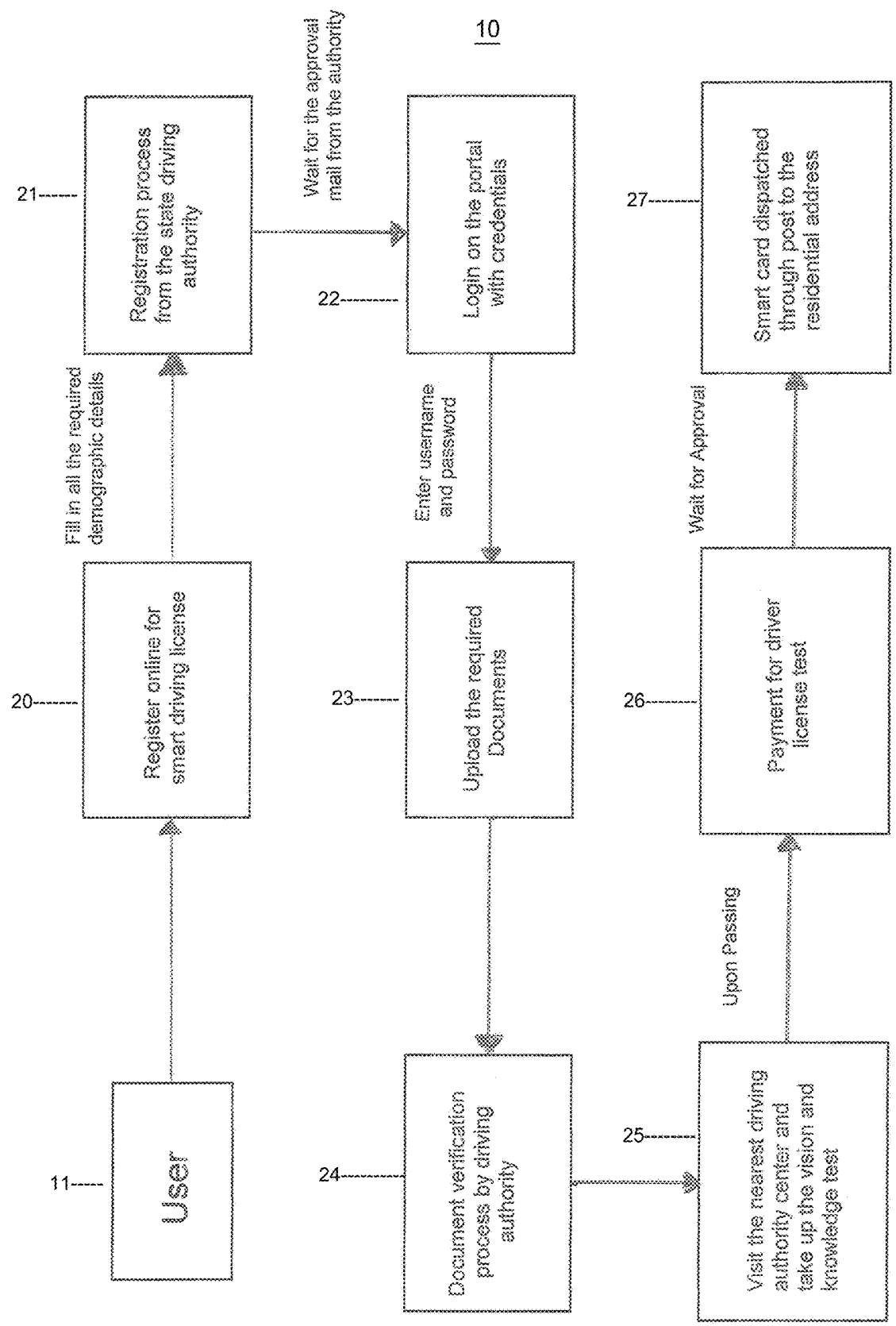
FIG. 3 is a flow diagram of the registration process of the smart card device of FIG. 1.

Referring to FIG. 3, the smart card 10 registration process is shown. Registration for the smart card begins with the user registering online for a smart driving license card 10. The user must fill in all the required demographic details. The registration process is then processed, evaluated and authenticated from and by the state driving authority The user then waits for approval from the driving authority. Once approved, the user may login on the portal with the proper preapproved credentials by entering their username and password. Next, the required or requested documents are uploaded. A document verification process is then conducted by the driving authority. Thereafter, the user/driver visits the nearest driving authority center and takes the vision and driver knowledge test. Upon passing, the user makes payment for driver license test and awaits approval. If approved, the smart card 10 is dispatched through post to the residential address.

Figure 4:
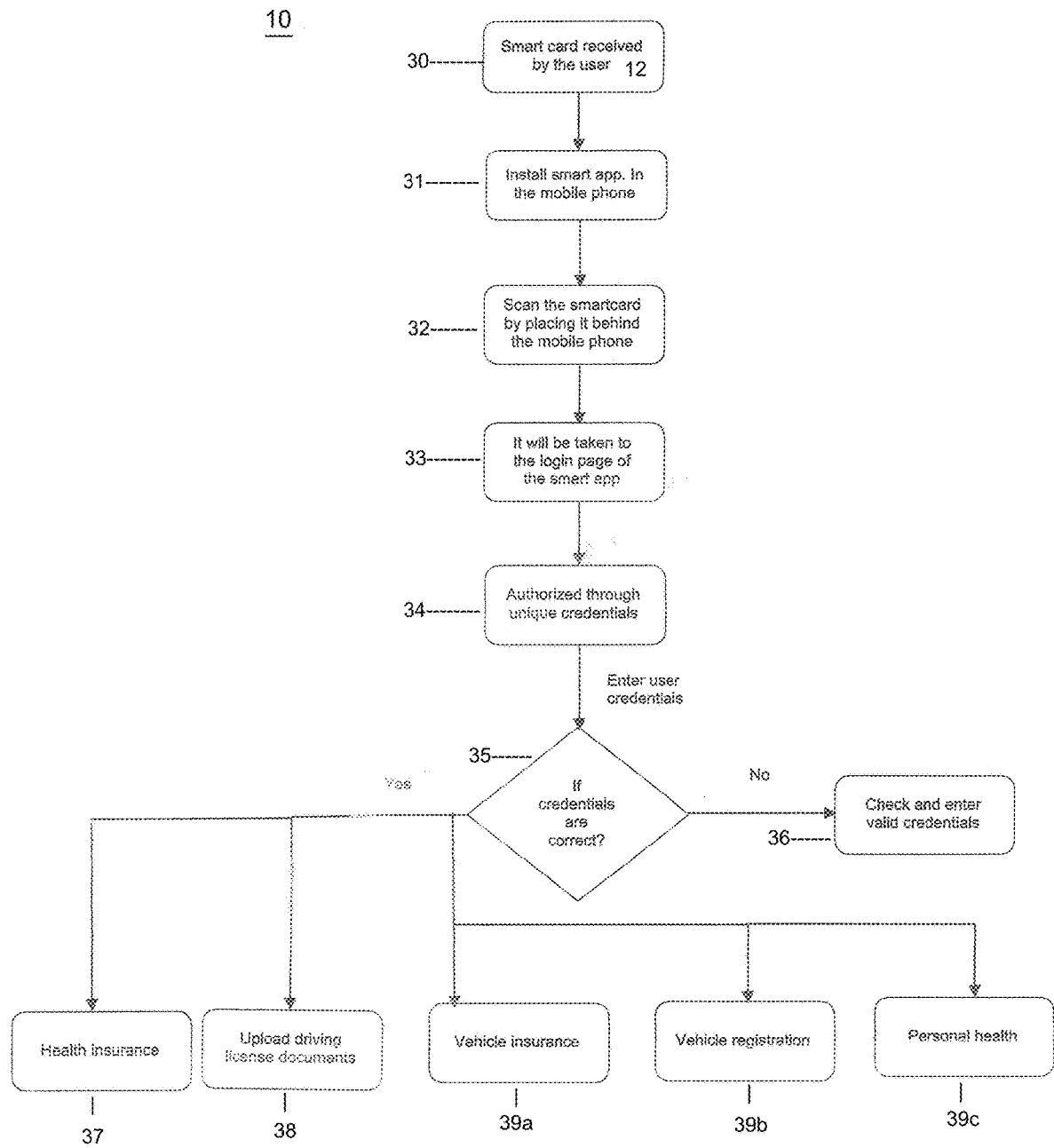
FIG. 4 is a flow diagram of the data upload of the smart card device and system in accordance with the instant invention.

With reference to FIG. 4, the data upload flowchart for uploading data to the smart card 10 is shown. When the smart card is received by the user, the user installs the smart app of the instant invention 10 in their mobile phone or other mobile communication device. The user then scans the smart card 10 by placing it behind the mobile phone which is then directed to the login page of the smart app 10 and authorized through unique credentials. The credentials are verified for correctness. If the credentials are not correct, then the user is to check and enter valid credentials. If the credentials are correct, then user can upload health insurance information, driving license documents, vehicle insurance information, vehicle registration information and, or personal health information.

Figure 5:
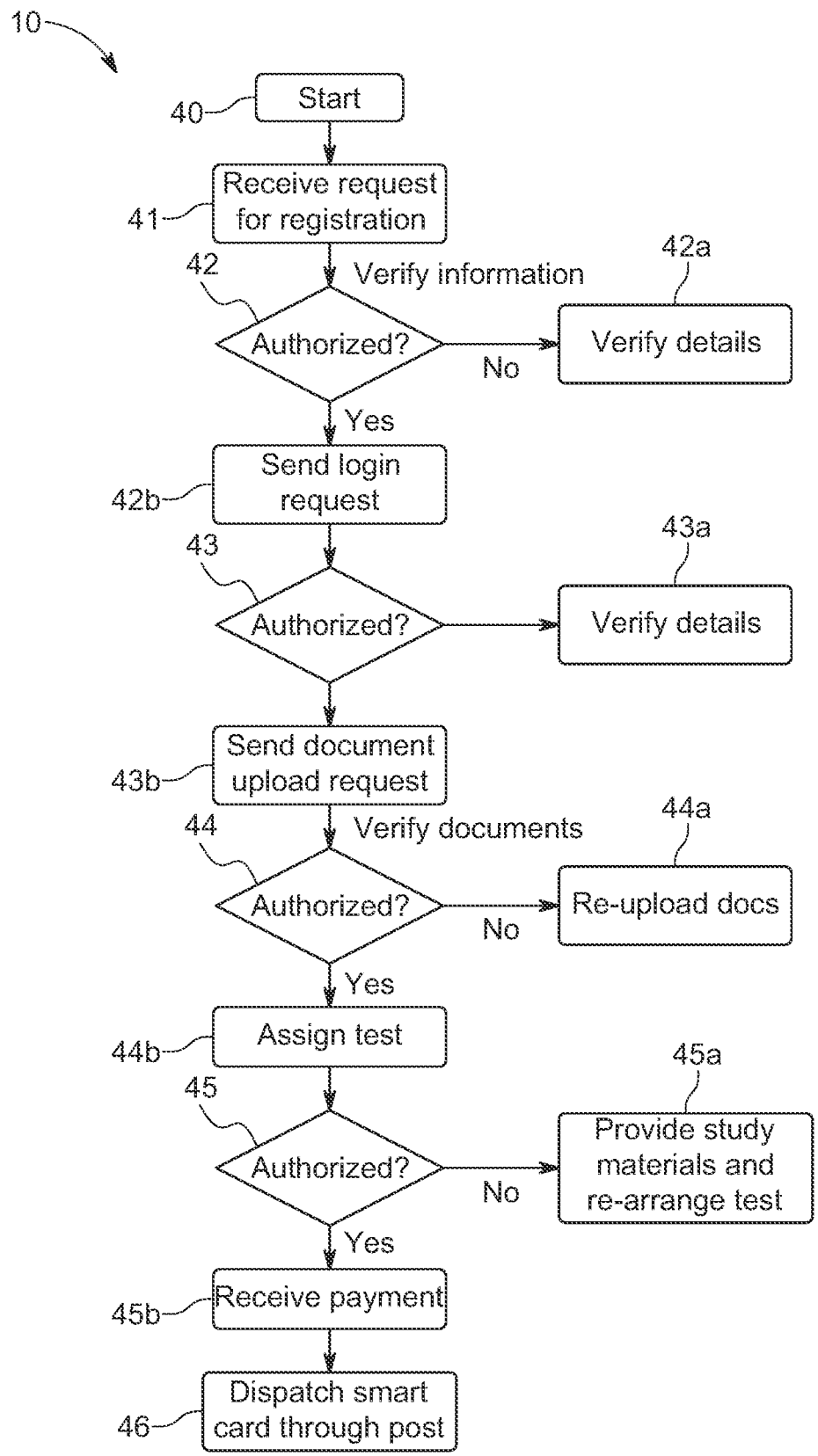
FIG. 5 is a flow diagram of the data validation process from the administration end in accordance with the instant invention.

With reference to FIG. 5, the administration data process/validation is shown. To start, a request for registration is entered and received. The information is processed for verification to determine whether the user is authorized. If not authorized, the system 10 verifies the information. If the information is verified a login request is sent and processed for authorization. If the login request is not authorized, the system 10 verifies the details. If authorization is granted, a send document upload request is made. The documents are then verified for authorization. If not authorized, documents are re-uploaded. If authorized, then the system 10 assigns test for authorization. If not authorized, the study materials are provided, and the test re-arranged. If authorized, payment is received and then the smart card 10 is dispatched through post or mail.

Figure 7:
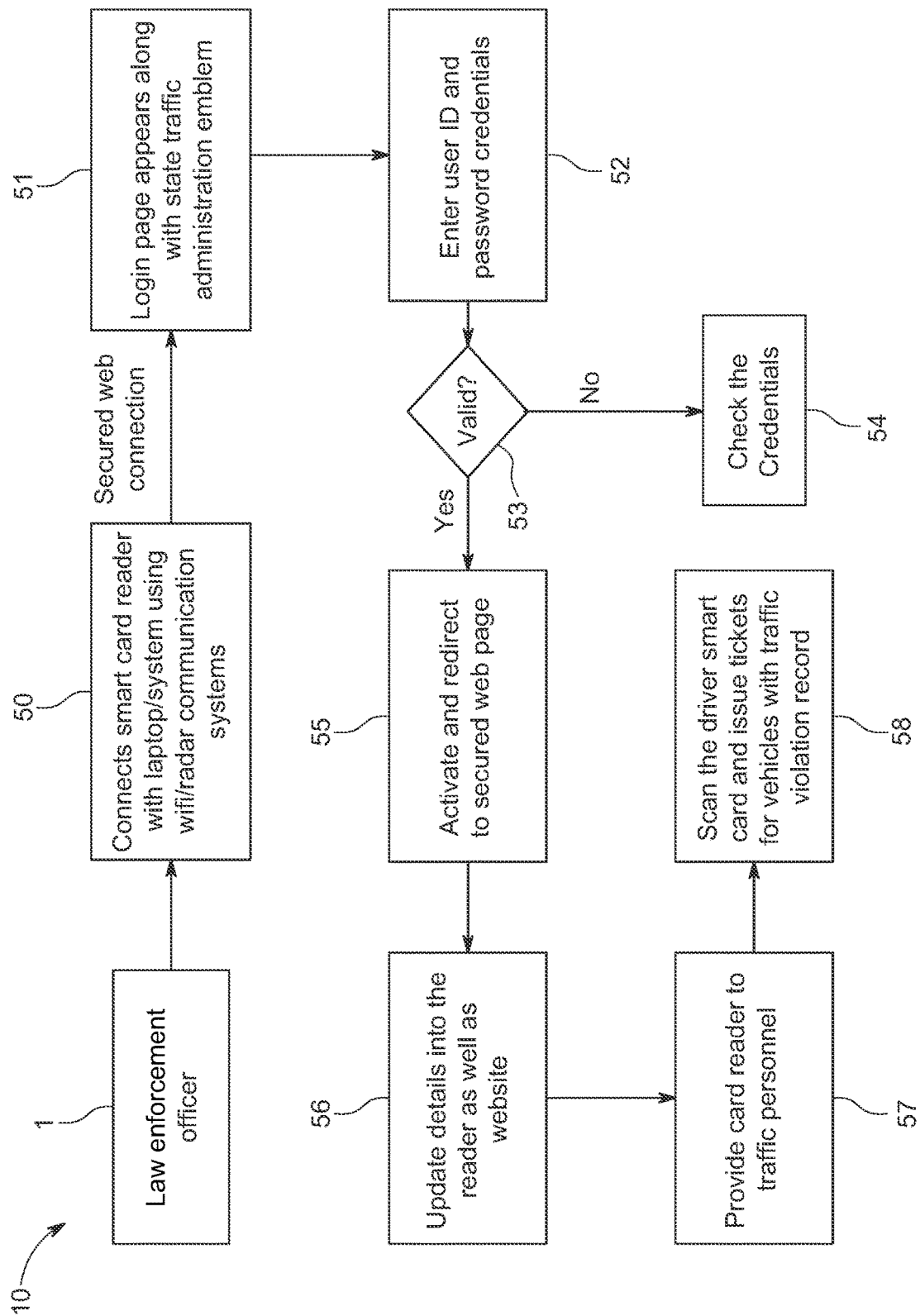
FIG. 7 is a flow diagram of the smart card reader data access process in accordance with the instant invention.

With reference to FIG. 7, a block diagram of the smart chip and reader module and smart card reader data access flowchart for a law enforcement officer are shown. A law enforcement officer connects smart card reader with laptop/system using Wi-Fi/radar communication signals with a secured web connection. The login page appears along with state traffic administration emblem on the secured web connection. The user enters a user ID and password credentials which are processed and checked for validity. If the user ID and Password are not valid, the credentials are checked. If the credentials are valid, the system 10 activates and redirects to a secured web page where details are updated into the reader as well as the website. The system 10 then provides card reader to traffic personnel and scans the driver smart card and issue tickets for vehicles with traffic violation record.

Figure 8:
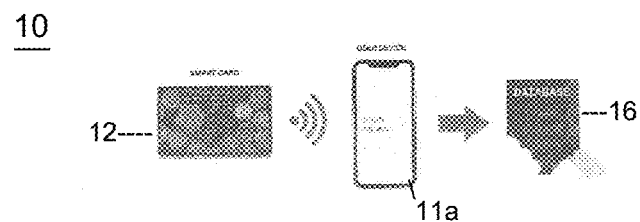
FIG. 8 is a diagram view of the basic model of the smart card device and system in accordance with the instant invention
Figure 9:
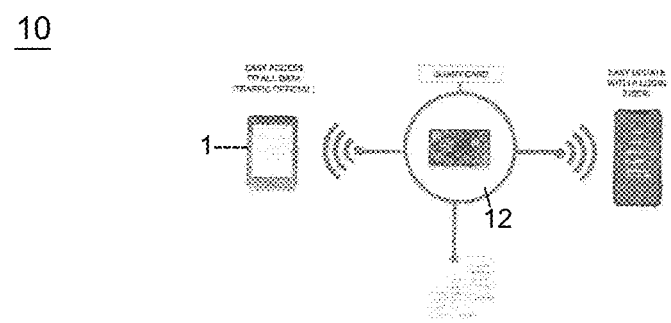
FIG. 9 is a diagram view of the smart card system synchronization in accordance with the instant invention. 1.

With reference to FIG. 8, a basic model of the smart card system 10 is shown. The uniqueness and novelty of this project is achieved through the medical data concept. Along with the driver's DL and vehicle data, individual healthcare information is also stored in the smart card 10 microchip to help users during their medical emergencies. The smart card reader allows the authorized traffic personnel in the line of sight to remotely access the smart card 10 information. Traffic personnel can then share information with emergency medical services and the driver's emergency contacts, that is, the wirelessly digitally retrieved critical medical information. The unique mobile app is designed in correspondence to the smart card 10 to allow the user to update their details periodically. To do so, the user places the smart card 10 behind their mobile phone for scanning purposes. After successful scanning, the system 10 automatically goes to the login page of the application for authorizing and validating the details. Later, it is processed to the URL and database where the information can be stored and retrieved. Also, the image of the person in smart DL acts as a unique color QR code. Scanning the person image through the smart mobile application will lead to the web-based URL for login purpose. In addition, the wireless communication range of smartcard to reader module is calibrated and designed to 100 m. This allows traffic personals to read the smart card with a 100 m communication range.

Furthermore, integration with NFC module allows users to achieve new URL whenever they log in to the database. This process further enhances security factors and avoid duplication or data theft In addition, with increased probability of getting the database backed, the unique strategy of the instant invention 10 helps to secure the information and gain user's trustworthiness. Additionally, a Non-Return to Zero (NRZ) Encoding technique is introduced to securely transfer data in slow speed communications interfaces for both synchronous and asynchronous transmission.

The overall working procedure of the proposed smart card system is further categorized into three stages namely input data, database access, and data updating and will be explained in the following stages.

With reference to the drawings, the input data is an important feature of the instant invention. Complete details about the input metrics considered for this research are represented along with a working principle of different sensors/modules. Control panel and individual authorization to access or write data for the proposed smart card system is shown in FIG. 4 where it defines the data flow and authorization of smartcard provided to the users. The detailed input dataset considered for instant invention are as follows. The input dataset includes the USER (use rid, first_name, last_name, address, dob, gender), DRIVING_LICENSE (userID, dl_no, class, issue date, expiry date), PERSONAL_DETAILS (userID, height, weight, eye color, hair color, blood-group, allergies, medical history), REGISTRATION_CERTIFICATE (vehicle type, vehicle make, vehicle insurance, plate no, issue date, expiration date, class, name_of_manufacturer, date_of_manufactoring), DRIVING_VIOLATIONS type_of_violation, driver name, date_of_event, penalty, relation_with_owner); and INSURANCE (userID, insurance no, insurance class, effective period, coverage, chassis no, vehicle_reg_no).

These parameters are crucial and play a significant role in determining individual health conditions as well as his driving credibility score. The user uploads input data through the mobile-based application (App) which is stored in the cloud-enabled database. The smart card device 10 gets activated and allows other persons, such as driver license offices, law enforcement, medical personnel and, or other authorized personnel, to monitor the user database within the range of 100 m. Cloud data is synchronized, preferably in real-time, with the smart card 10 and other modules connected with those particular login credentials. Whenever data gets updated, it is shard/stored in the other connected modules.

Various components used in the smart card are shown in FIG. 6. The user is provided with a smart card and traffic officials with the smart card reader. Different sensors such as RFID, NFC, MRZ, and Biometrics are used to store, retrieve, secure, and transmit data for a longer distance. A brief working procedure is as follows.

The smart card device and system 10 includes Radio-Frequency Identification (RFID). In recent times, development in the field of RFID systems is at a rapid pace. Since world war II, where it is used to recognize whether the combatants are "friend or foe," its application areas were extended to asset and people tracking, healthcare, and so on. In this research, a unique FID tag is deployed in the smart card which can store, read, and write data. A unique identification number helps to access the database from anywhere and retrieve data for verification purposes. It allows helps to retrieve or sense data from a long distance of 100 m. A typical RFID module comprises an integrated chip (which stores a unique identification code) and can be energized through an EMF. Reader (interrogator) is used to read and write data, antenna to transfer data for certain distance. Software application acts as a middleware during this process. The key features of the proposed RFID technology are a long range transmission and detection up to 100 m, an ultra-low power consumption, an additional built-in ports and a compact size.

The smart card device 10 of the instant invention uses Near Field Communication (NFC). NFC is a trusted, intuitive approach to identify, authenticate, the nearby corresponding devices either through the hardware module or smartphone app. It also enables new capabilities throughout the product cycle. By integrating NFC in smartcard yields higher communication range along with efficient two-way communications. It also helps to synchronize with mobile applications and reader devices in a user-friendly, and effective manner. As security aspects play a significant role in data communication, a robust security protocol is developed where an individual will be provided with a secure unique NFC authentication message each time the documents are updated. The mobile application reads the update tap, unique URL, forwards the secure tag, an authentication code to the cloud for verification and returns the results. This process is compatible with iOS, Android versions of mobile as well as smartcard reader.

The instant invention 10 also includes a Machine Readable Zone (MRZ) detection module. MRZ enables users with a faster approach to scan/process the URL and update/store information in the database. It can be easily integrated with the smartcard reader or the mobile application. Also, during network issues, traffic enforcement officials can scan the smartcard MRZ code with the card reader machine and can access the data.

The instant invention 10 includes and uses or employs a unique color QR code. The person's image in the smart DL is designed in such a way that itself acts as a unique color QR code. When it is scanned through the mobile application, it will lead to the login page of the secured web URL where the individual can log in, upload/update the data. It also allows users to access static data by just scanning the person's image. It further adds additional, user-friendly, and secure login options in the smart card.

The smart card device and system 10 of the instant invention also includes biometrics. Biometrics are introduced into the smart card 10 to enhance security features. A user will be evaluated and verified through this process to ensure that the person updating or accessing the documents is a genuine user of the respective database.

The instant invention further includes the smart card mobile application (App). The smart and user-friendly mobile application is developed to empower users in uploading/updating the authorized documents on the website. It plays a significant role in the overall operating process. In order to upload/update data, the smart card 10 is placed on the back side of the mobile application and scan the unique code. The app will scan the QR code integrated with the smart ID card and proceeds to the login page of the user. At this stage, the person can read the data and present status of a vehicle, DL, and other input data. The user can write the data by entering the authorized credentials. If it is verified and found genuine, it will be further pushed to access the application, URL, and directed to the website, where users can write the data. Additionally, a unique URL will be created every time the user login to the database, and the same will be stored. This process minimizes the chances of getting duplicated or data theft.

The smart card reader of the instant invention 10 includes the following features and specifications. This device is designed concerning the traffic authority perspective. During this process, the authorized traffic officers can extract the driver's data from a 100 m range, verify, and take necessary measures during fraudulent cases. Its capability to extract and process data is higher, more accurate, and faster compared to other existing modules. Additionally, this entire process is cloud enabled. During instances where a user has an accident or violated traffic rules, respected traffic officials will be provided with an option along with credentials to update the information in the database. The smart card also includes an antenna and other options. It will allow traffic officials to customize the network range, which further helps to limit power usage. Its low power consumption and flexibility increases the durability of the module and minimizes frequent maintenance requirements. The UID number of the card reader is unique in nature, and it does not match with other reader machines. Its smart card sensing, and operation principles are further divided into two categories, namely direct mode, and buffering mode. In direct mode, the data sensed from the smart card by the reader will be directly uploaded to the host machine in real-time. In buffer mode, the data which are requested by the host machine will be sensed and stored.

With respect to the database access of the instant invention, the data submitted by the person with a smart card 10 as well as the data provided by the law enforcement officials during traffic rules violations is verified by the admin for its originality and correctness. The instant invention 10 aims in verifying individuals DL, vehicle, and medical documents, authorization to edit will be provided only for certain documents and for few areas.

With reference to FIG. 3, there is shown the step-by-step procedure for registering a new smart card 10. This process is similar to that of the manual driving card registration process, which involves filling the application through online, registering through unique password details, uploading the document, verification, and taking up the test, payment and dispatching smart card for postal address. This entire process is carried out through the government authorized web services. The same procedure is repeated to update data. If the user wants to change the data in smart card 10 (allowed for certain options), again it has to be placed behind the phone for scanning purpose, it will be guided to the login page. The person should enter the user credentials, and after successful verification, the details can be updated.

The detailed procedure for scanning and uploading the documents through a smart card is shown in FIG. 4. Once the smart card is received, the applicant has to download the mobile application. The smart card is to be placed behind the mobile. If the unique barcode/number gets scanned, it will take to the login page of the user. The person should enter his login credentials and upload the documents concerned to his vehicle, DL, health, and medical details. A similar procedure is followed to update data. If the user wants to change the data in smart card (allowed for certain options), again it has to be placed behind the phone for scanning purpose, it will be guided to the login page. The user should enter the user credentials, and after successful verification, the details can be updated.

With reference to FIG. 5, the workflow of verification is carried out from the admin end. Every document, along with supported proof uploaded from user's end, is verified by the admin. Once all the papers get checked, a smart card will be issued, and the same process will be followed for evaluating updated documents.

Figure 10:
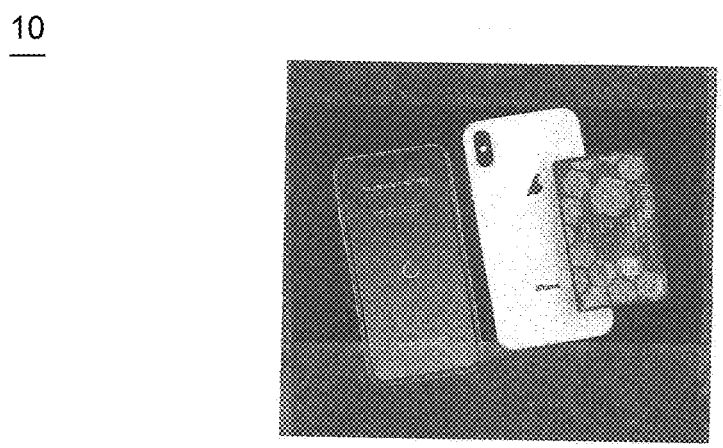
FIG. 10 is a diagram depicting the data upload and update process in accordance with the instant invention.

With reference to FIG. 10, there is shown a pictorial model of the data upload process by placing a smart card behind the mobile. It also shows that once the card 10 is scanned, it is getting redirected to the login page. As explained above, the user will be provided with a smart mobile application to upload/update the data. Once authorized organizations issue the smart driving license 10, the user should download the mobile application and login through the confidential credential details. The smart card 10 should be placed behind the mobile and scan the unique QR details. It will push to the unique URL and cloud-enabled website. The user will be provided with a numerous option to either upload/upgrade the document.

Traffic officials are provided with a smart card reader to access the data with a 100 m distance range. Unique credentials are provided to login and update during fraudulent, misuse, and driving violation cases.

The design and operation of the instant invention are set forth infra. The workflow of admin/user data validation, and admin/traffic official are shown in the flow charts, such as FIGS. 7, 11 and 12, and are as follows: The input data comprising of details regarding vehicle and healthcare of the end-user is preprocessed and verified from the admin side before it is being stored in the smart card. With reference to FIG. 7, the flowchart of smart card reader data access/management is shown. Initially, the law enforcement officer will connect the smart card reader to system/laptop with Wi-Fi/radar connection. Once it is connected, the software gets redirected to the login page with their state traffic administration emblem. The enforcement officer should log in with the credentials. After the credentials get verified and found genuine, the web page gets activated and will be guided to the dashboard where the data can be uploaded and monitored through a secured database connection. The updated smart card reader is respective traffic official to identify the vehicles from long distance and issue tickets.

Figure 11:
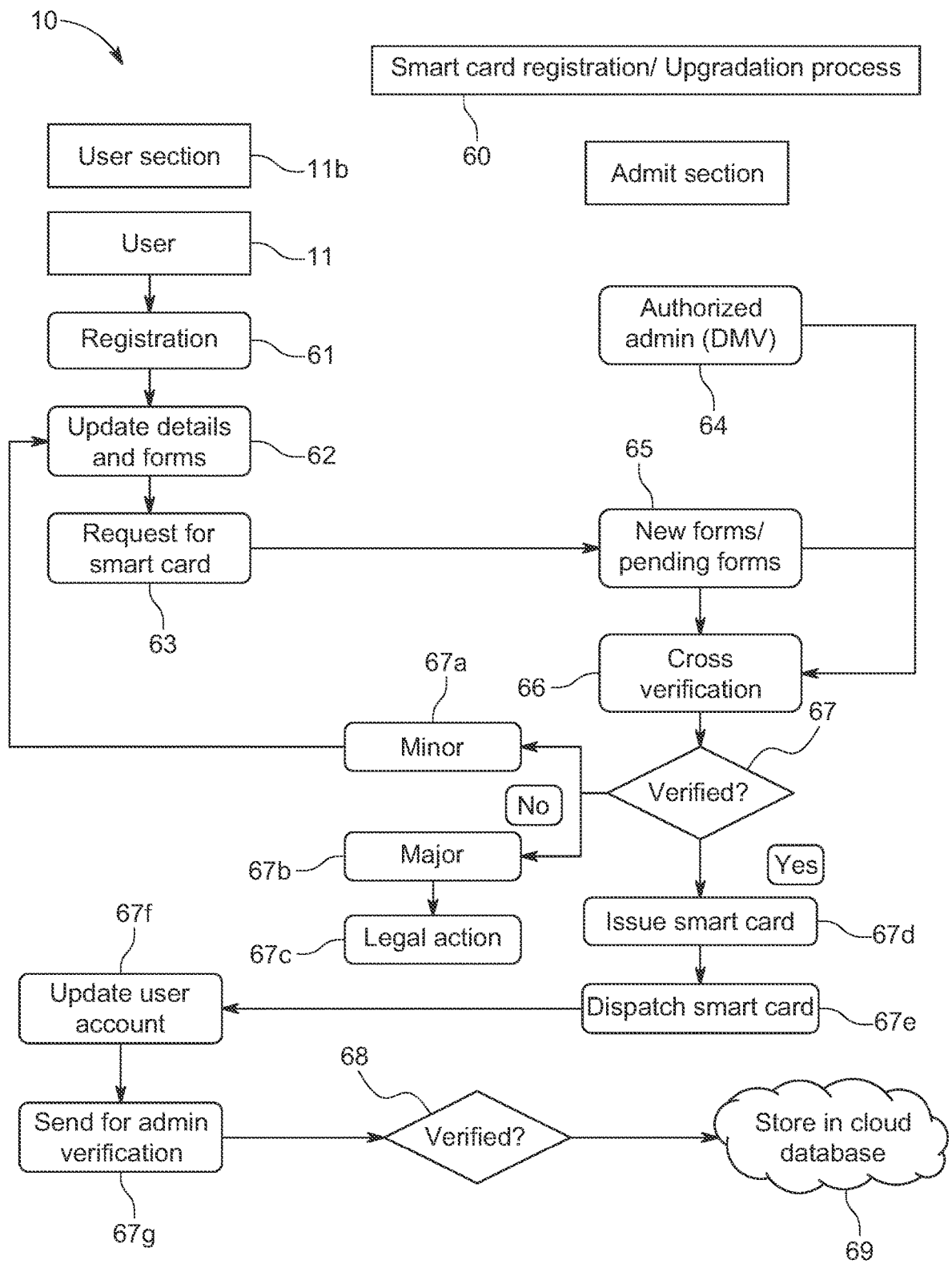
FIG. 11 is a flow chart of the administration/user smart card registration and validation process in accordance with the instant invention.
Figure 12:
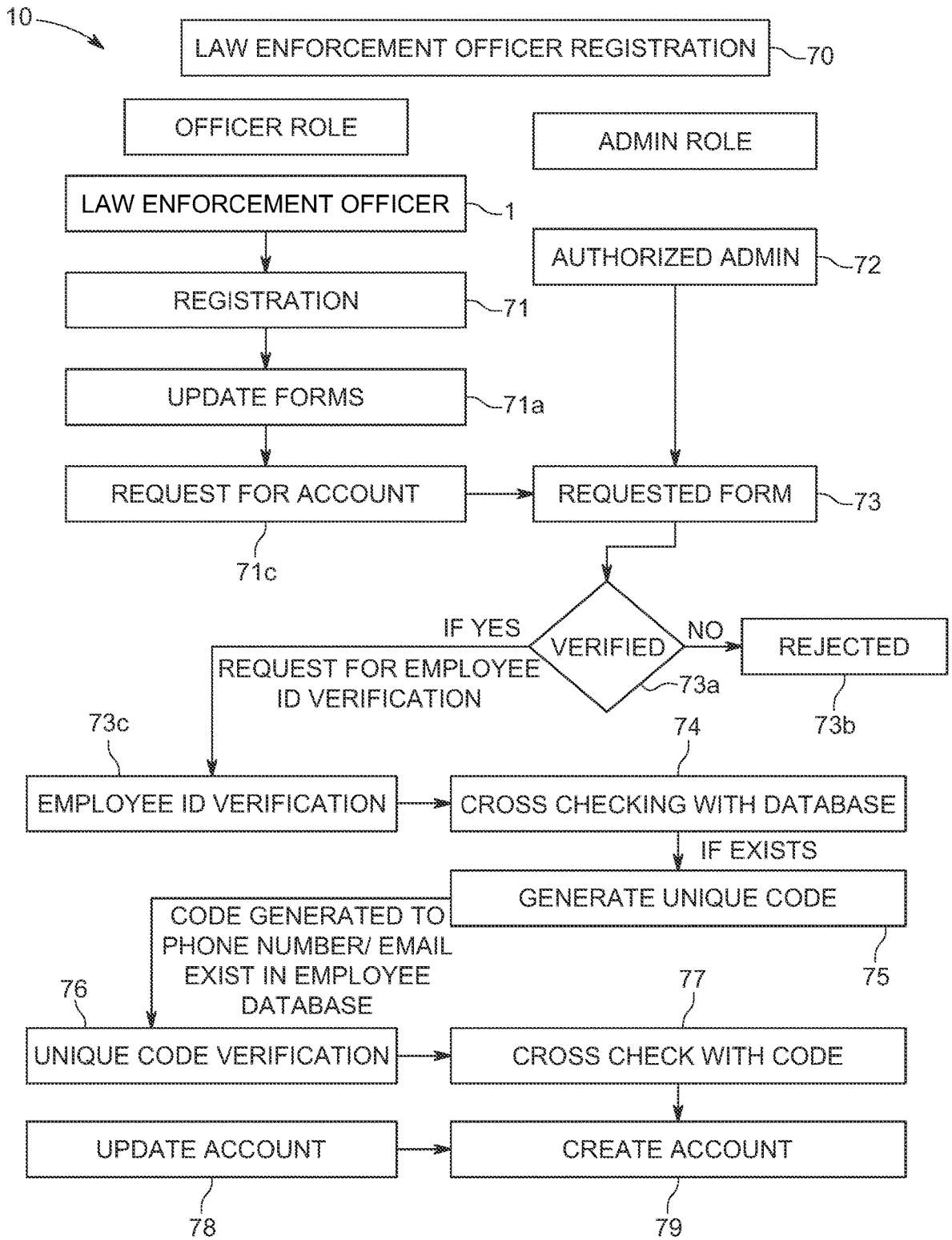
FIG. 12 is a flow chart of the law enforcement officer or traffic official administration evaluation process in accordance with the instant invention.

The detailed document evaluation and cross verifications from the admin side is shown in FIG. 11. Once a user uploads the documents by scanning the smart card 10 through the mobile application, it will be processed to the admin end. Admin verifies for the correctness of the document. If those details are found to be accurate, it will be uploaded in the cloud-enabled database of that URL. If it is found false, the admin will again crosscheck whether it's an updated document or not, or the person has any traffic violation history. If so, that person is penalized with a certain amount and mentioned to update documents concerning the same. This process is continuous until the data is processed from the admin end. FIG. 12 shows the flowchart of the document verification process from the admin end and traffic officials. Once the registration process and request forms are obtained, unique credentials will be given to the traffic officials. Prior to that, the officers' documents should be validated from the admin end (a government authorized person) to evaluate the correctness and check for any false information. Once the admin proceeds the form with the evaluation results, a unique employee ID and the code will be provided to login and allow to modify and upload details of the driver concerning traffic violations, rules break, etc. with prior references.

The smart card device and system 10 of the instant invention enables traffic management personnel and drivers with an easy process to access their vehicle, DL, and medical data. The smart card 10 is preferably an NFC, RFID, MRZ, color QR code, & biometric-enabled chip used by drivers. It allows traffic officials to capture the vehicle registration and individual DL details through a wireless medium within a distance of 100 m via the smart card reader. The information on the smart card cannot be retrieved by any device other than our smart card reader. It also acts as a secured source with multifactor authentication techniques to prevent the tampering of data or information stored in the card. The card 10 has a unique identification number, which is encrypted by the authorized transport administration to evaluate their driving norms. This card, whenever brought close to any means of the reader (within 100 m range), it is redirected to a URL to fetch the static data. The details that can be stored and accessed through the card are personal details, driving license, vehicle registration details, traffic signal violation history, insurance details, and medical history. The legacy procedure of paper works can be reduced through this smart card 10, and additional information can be stored in a single centralized database, which will reduce the time consumed for traffic procedures and even will be helpful for emergency cases such as in the event of accidents. It will be easier to identify the user and get contact details of his close relatives. The driver's medical history will be helpful for healthcare professionals to take fast actions. Even insurance details help in case of close one's absence for claiming expenses. It also holds the traffic violation history, which is easily accessed by the traffic law enforcement officer, and it may bring down the violations to as minimum as possible. This technique can be a smarter step towards digitalization.

With reference to the drawings, the instant invention 10 provides a next level advanced traffic management system. The instant invention 10 enables both traffic officials as well as users to easily access and periodically monitor the vehicle details, driving license, insurance, etc. The instant invention 10 may also provide access to personal health data of the driver facilitates in easy identification of a person and connect to their contact details during emergency cases. Further benefits of the instant invention are as follows.

Figure 10A:
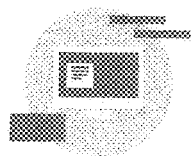
FIG. 10A is a diagram of the paperless user friendly access process in accordance with the instant invention.

With reference to FIG. 10A, with a single touch and login credentials, the user's complete vehicle history, DL, insurance, medical history, and insurance can be retrieved, at any place, and any time. Also, carrying paper material is minimized, since the digital card is plastic material with a size almost similar to that of banking cards.

Figure 10B:
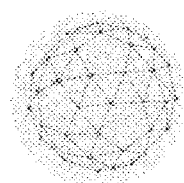
FIG. 10B is a diagram of the next generation user experience of the smart card device and system in accordance with the instant invention.

With reference to FIG. 10B, the instant invention 10 empowers users with a digital way of transferring their vehicle data to the authorized persons through a wireless medium. This overcomes the drawback of stopping the vehicle and showing numerous documents to traffic officials. Also, in case of medical emergency, nearby people as well as medical professionals can easily retrieve patient health history.

Figure 10C:
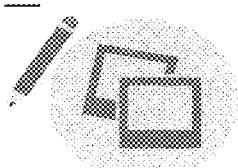
FIG. 10C is a diagram of the additional data support of the smart card device and system in accordance with the instant invention.

With reference to FIG. 10C, along with vehicle details, the smart card system 10 of the instant invention helps to store, update, and access healthcare data, which helps during medical emergencies. Any traffic violations or other information regarding traffic fraud cases can be easily stored and maintained in this single database.

Figure 10D:
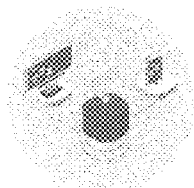
FIG. 10D is a diagram of the long range connectivity of the smart card device and system in accordance with the instant invention.

With reference to FIG. 10D, traffic officials can easily access the data from the distance of 100 m. If any fast approaching vehicles are spotted from long before, they will be notified from a certain range to slow down and submit their smart card for verification purposes.

Figure 10E:
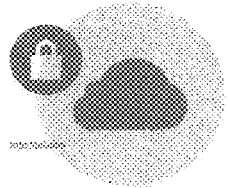
FIG. 10E is a diagram of the secure cloud storage of the smart card device and system in accordance with the instant invention.

With reference to FIG. 10E, enhanced data security can be achieved through the smart card system 10 of the instant invention. Unique barcode scanning, frequently changing URL, mobile application, and biometrics form a secured communication database, through which hackers cannot gain access to the system.

Figure 10F:
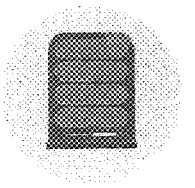
FIG. 10F is a diagram of the central database of the smart card device and system in accordance with the instant invention.

With reference to FIG. 10F, the instant invention 10 includes cloud storage which allows traffic officials as well as users to store huge amount of data. It helps to maintain a centralized database where individual data can be easily accessed and retrieved. It is also one of the cost-effective processes. Cloud-based document management is far less expensive than onsite storage. Scalability in data size can also be achieved through this process.

With reference to FIG. 11, the admin/user smart card registration, validation and upgradation process of the instant invention 10 includes the following steps and procedures. User Section Admin Section, User Registration, Update details and forms, Request for smart card, Authorized, Admin (DMV), New Forms/Pending Forms, Cross Verification (is it Verified?), Issue smart card, Update user account, Send for admin verification (is it Verified?). Store in Cloud Database, Dispatch smart card, Minor Mistake or Major Mistake and considering Legal Action (Yes or No).

Figure 13:
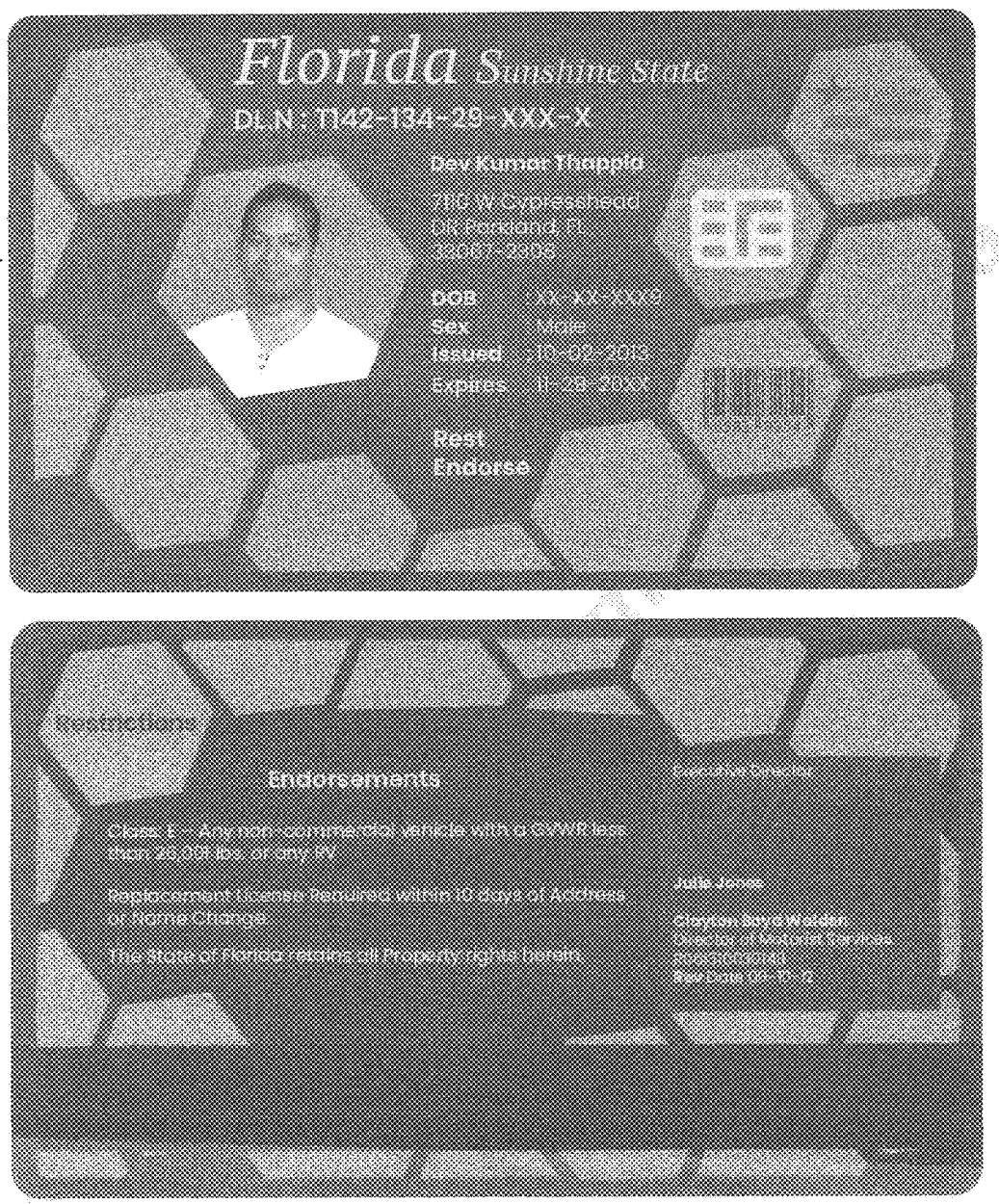
FIG. 13 is a front and rear elevational view of the smart card device in accordance with the instant invention.
Figure 14:
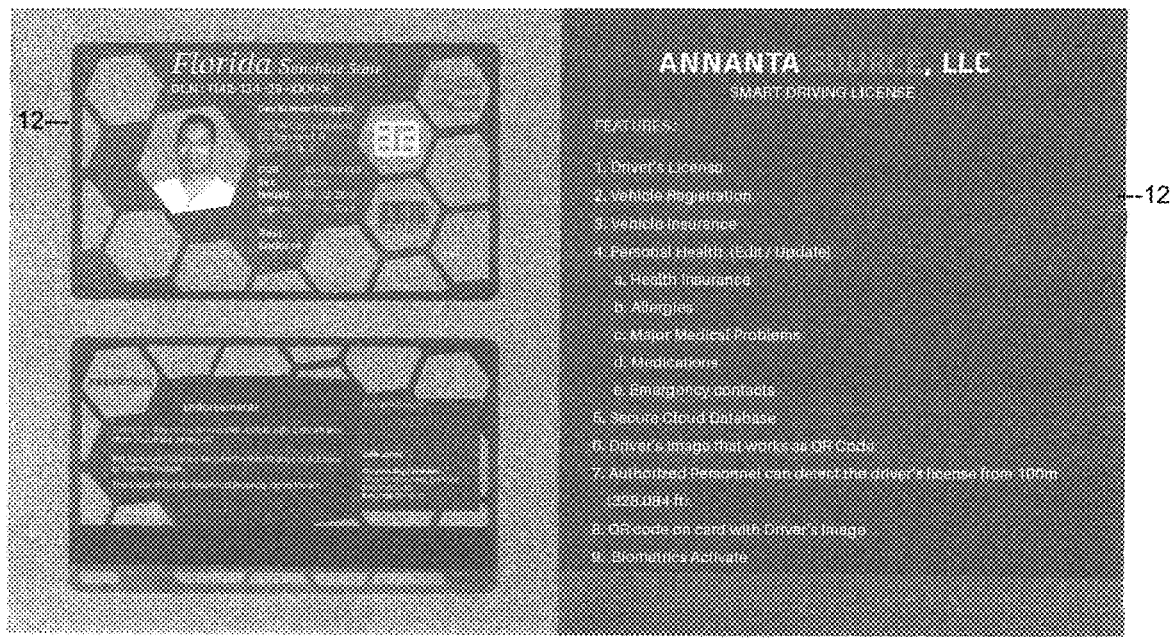
FIG. 14 is a diagram of the smart card database list of the smart card device and system in accordance with the instant invention.
Figure 15:
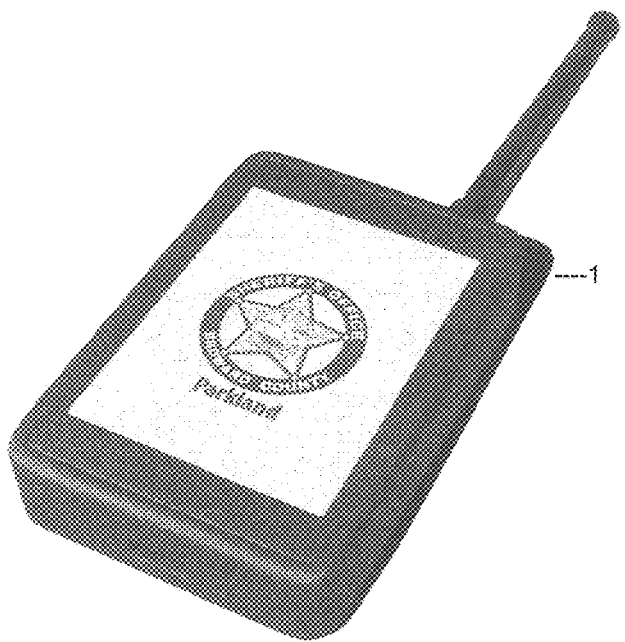
FIG. 15 is a perspective view of a 3D model of the smart card device and system in accordance with the instant invention.
Figure 16:
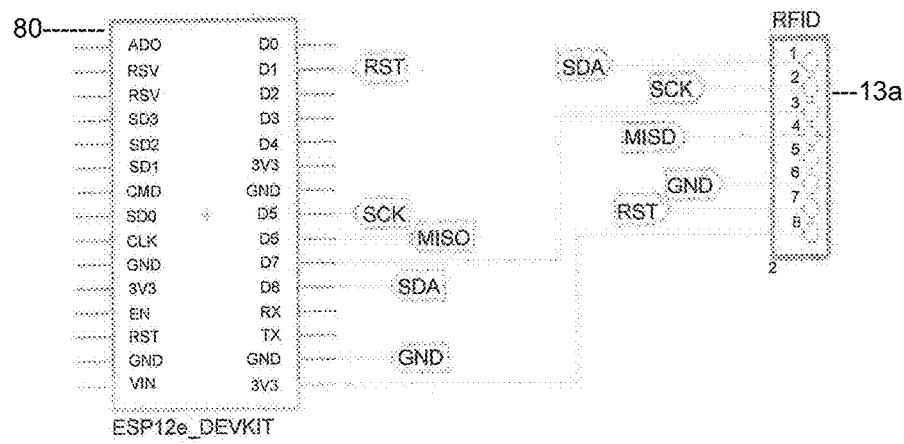
FIG. 16 is a circuit diagram of the RFID connection of the smart card device and system in accordance with the instant invention.
Figure 17:
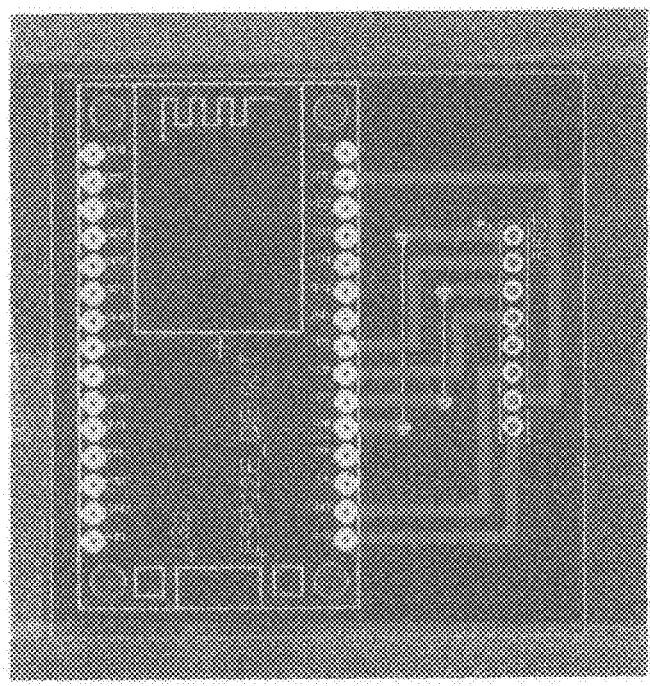
FIG. 17 is a diagram of the PCB design module of the RFID connection of the smart card device and system in accordance with the instant invention.
Figure 18:
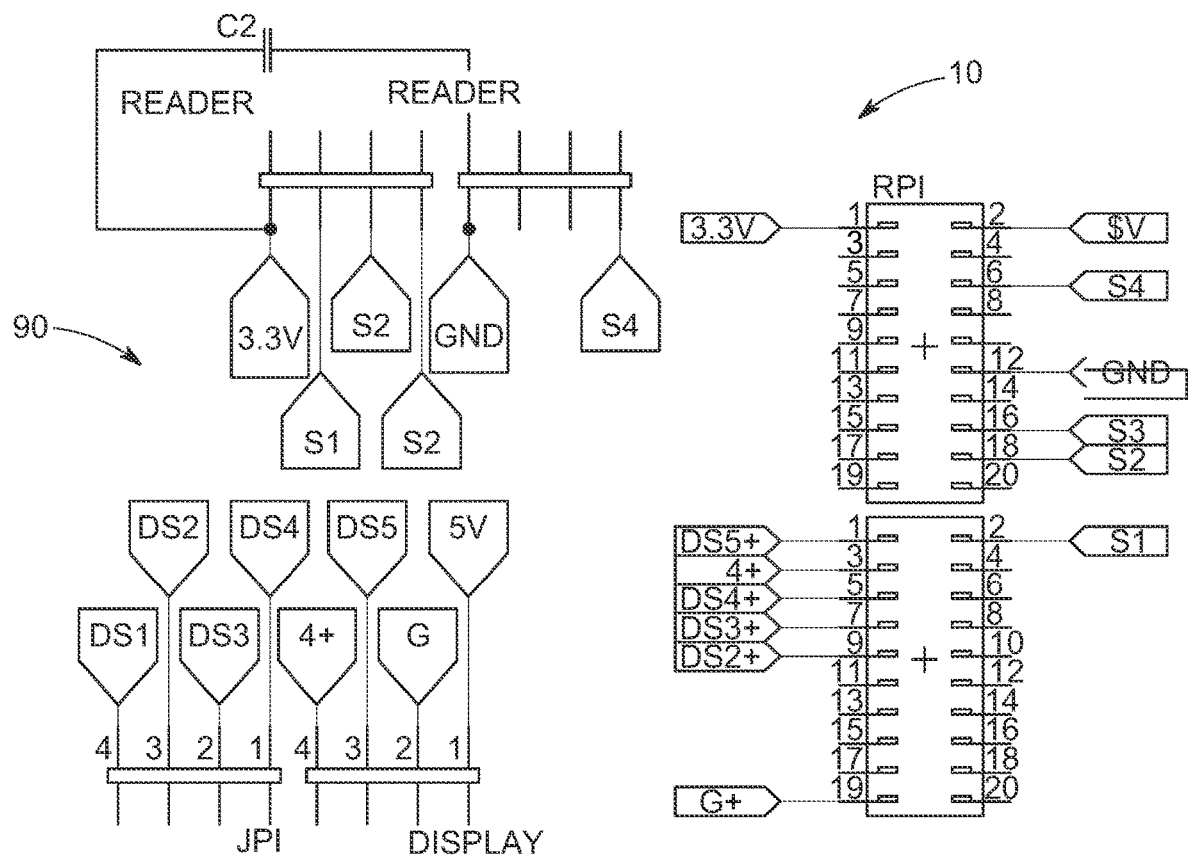
FIG. 18 is a schematic diagram of the reader module of the smart card device and process in accordance with the instant invention.
Figure 19:
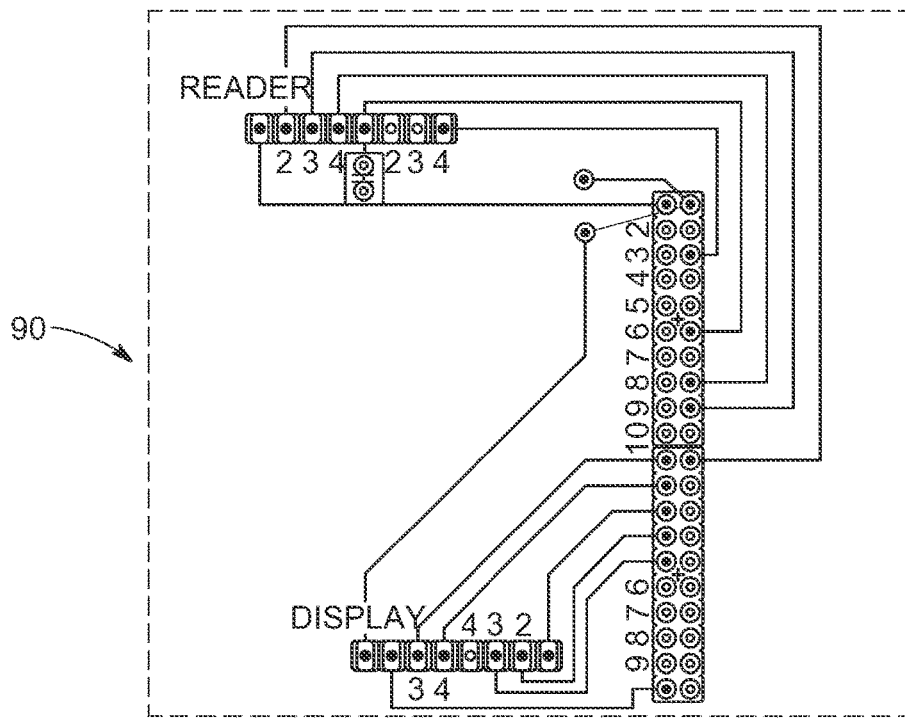
FIG. 19 is a diagram of the card reader PCB design of the smart card device and system in accordance with the instant invention.
Figure 19A:
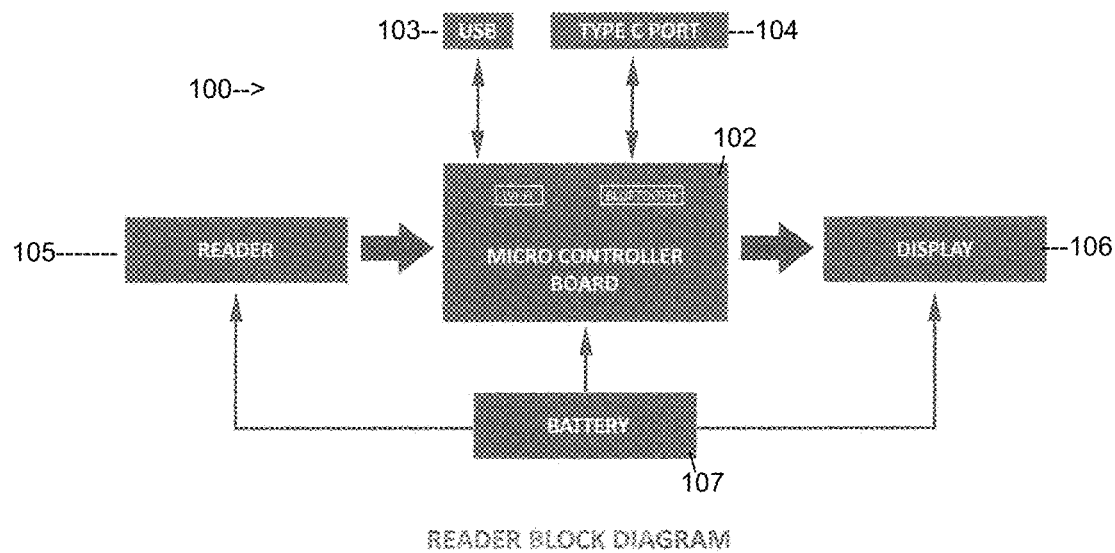
FIG. 19A is a block diagram of the reader of the smart card device and system in accordance with the instant invention.
Figure 20:
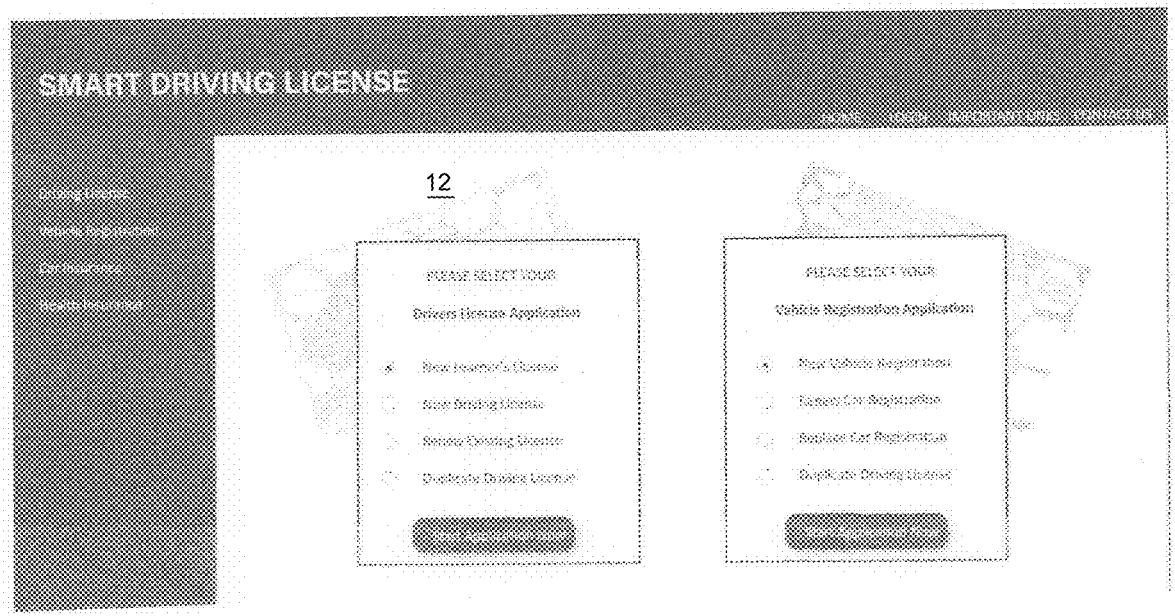
FIG. 20 is an illustrative view of the smart card web application dashboard of the smart card device and system in accordance with the instant invention.
Figure 21:
FIG. 21 is an illustrative view of the dashboard to upload login credentials of the smart card device and system in accordance with the instant invention
Figure 22:
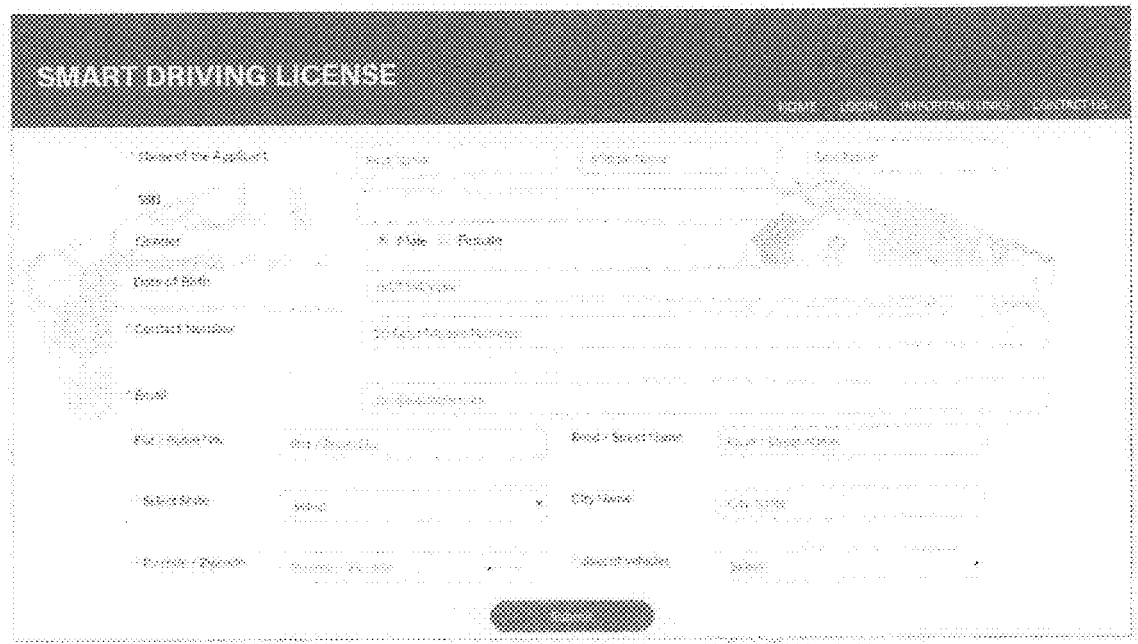
FIG. 22 is an illustrative view of the dashboard to upload individual details of the smart card device and system in accordance with the instant invention.
Figure 23:
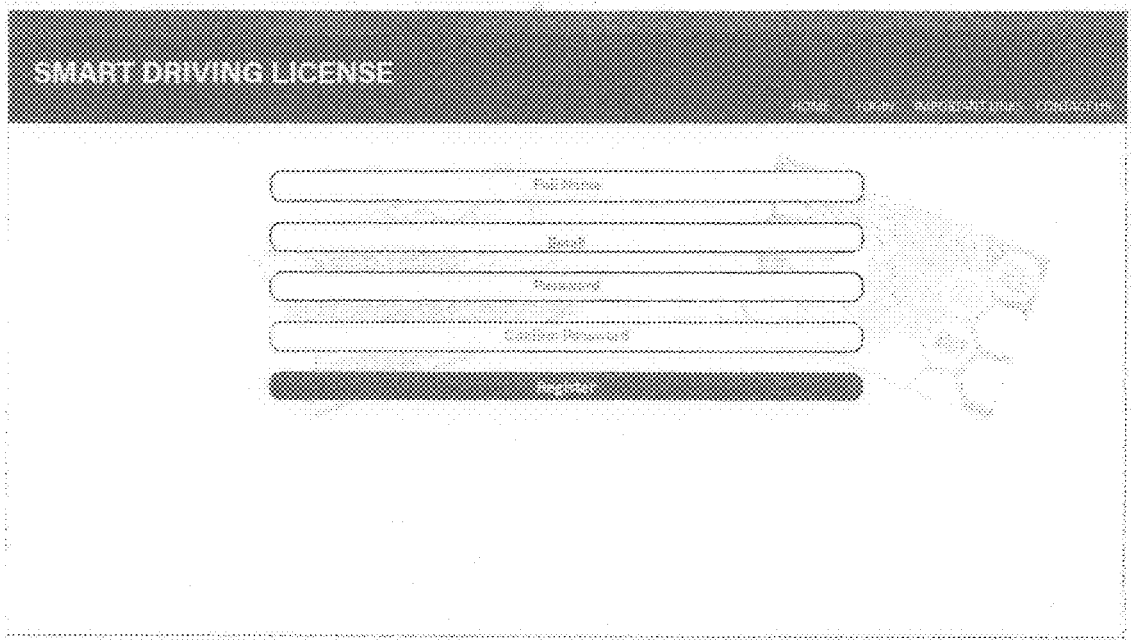
FIG. 23 is an illustrative view of the dashboard and additional login credentials to update details of the smart card device and system in accordance with the instant invention.
Figure 24:
FIG. 24 is an illustrative view of the dashboard to update and upload driver data of the smart card device and system in accordance with the instant invention.
Figure 25:
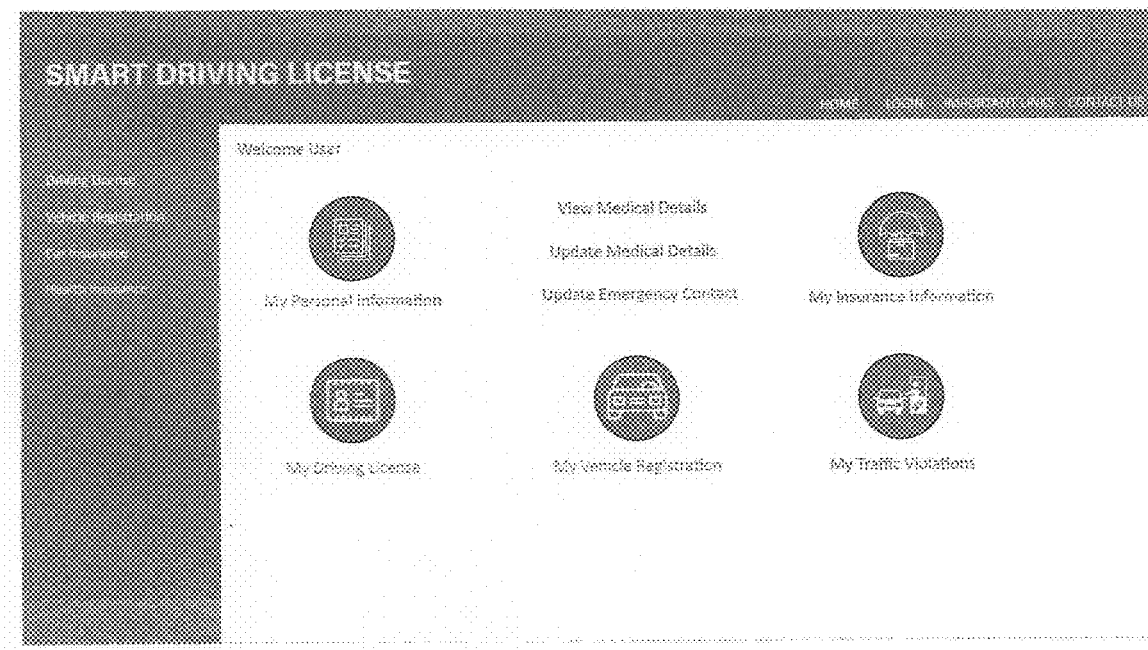
FIG. 25 is an illustrative view of the dashboard of internal options to upload and update details of the smart card device and system in accordance with the instant invention.
Figure 26:
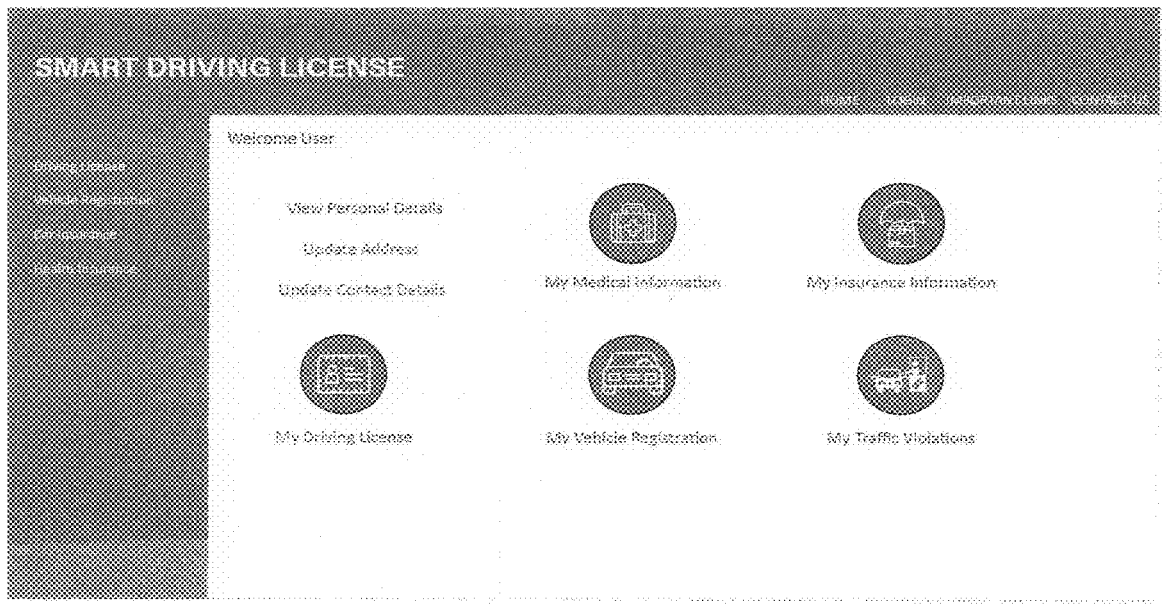
FIG. 26 is an illustrative view of the dashboard of internal options to upload and update detail of the smart card device and system in accordance with the instant invention.
Figure 27:
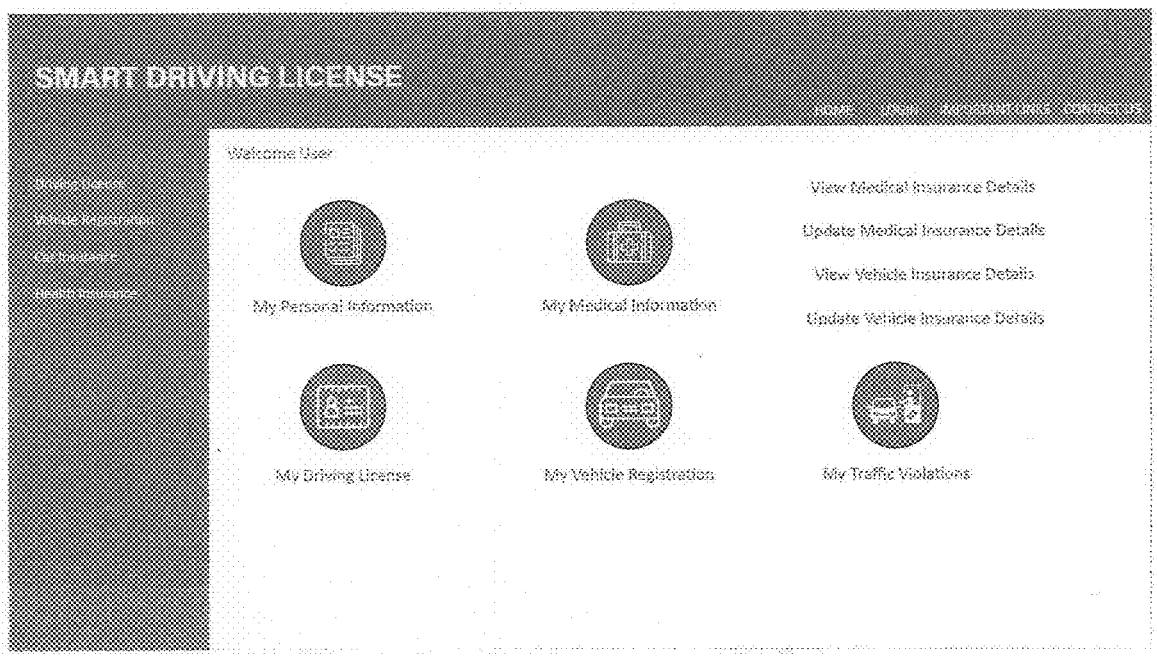
FIG. 27 is an illustrative view of the dashboard of internal options to upload and update details of the smart card device and system in accordance with the instant invention.
Figure 29:
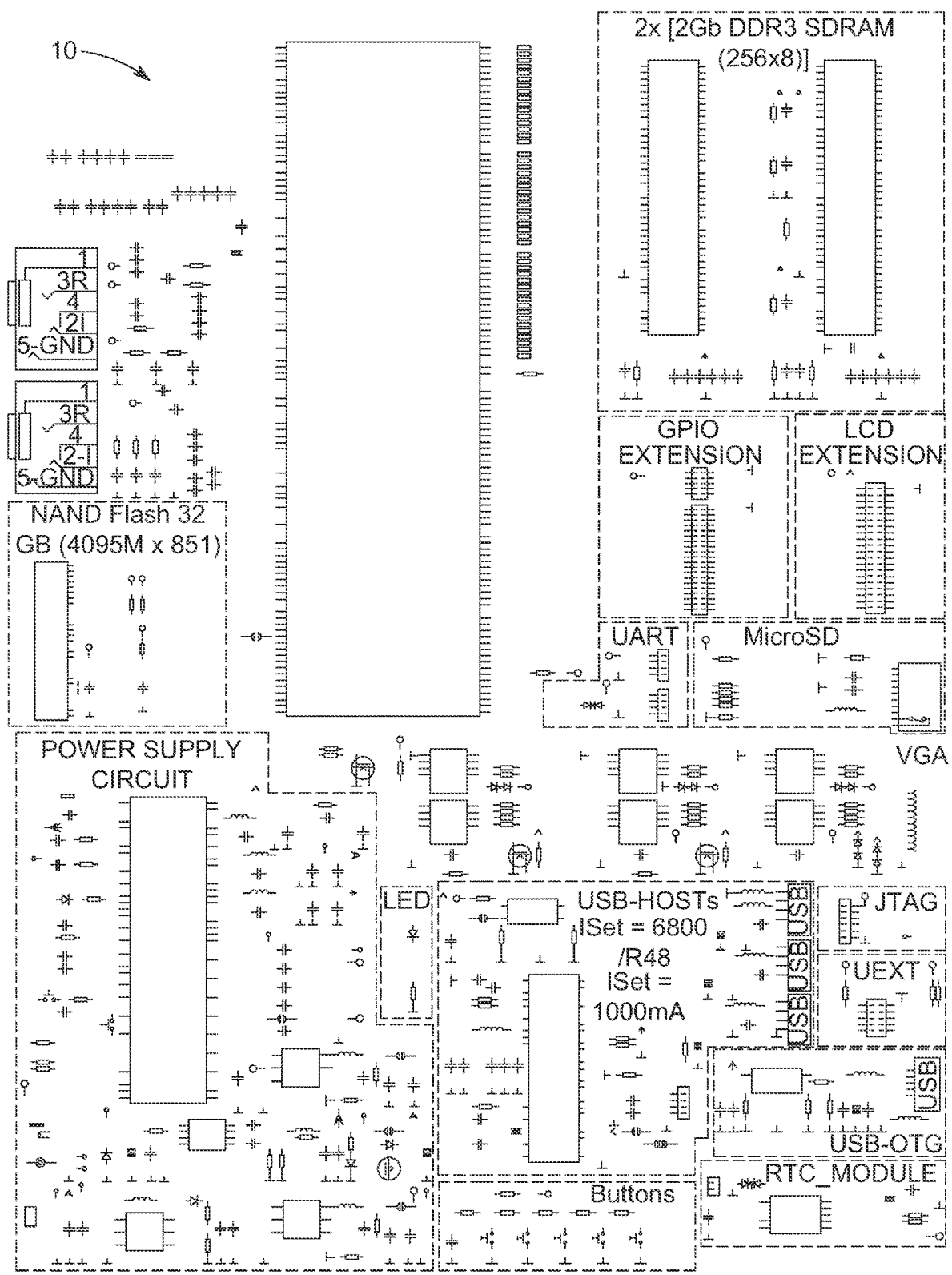
FIG. 29 is a schematic diagram of the smart card device and system in accordance with the instant invention.
Figure 30:
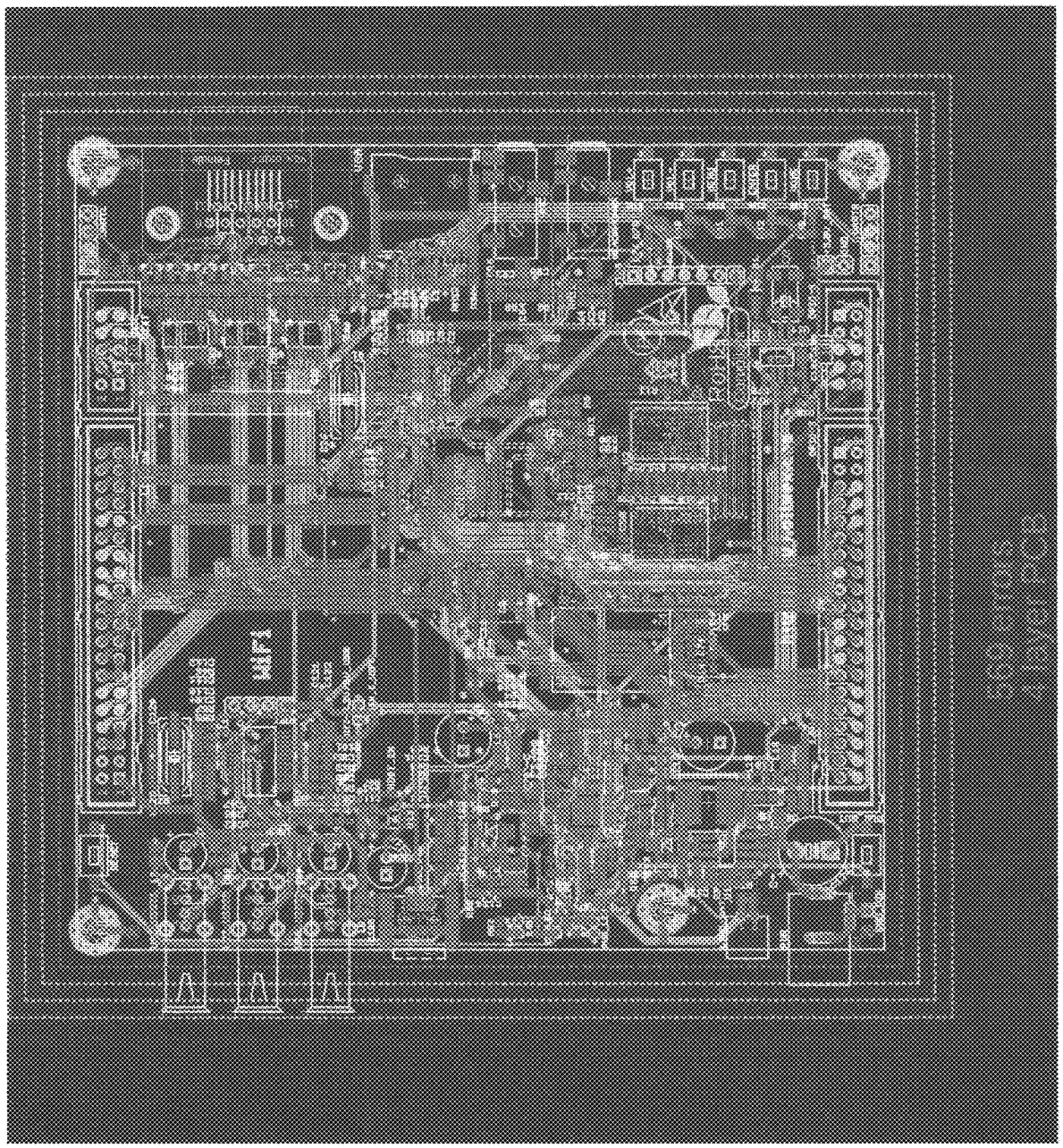
FIG. 30 is a printed circuit board diagram of the smart card device and system in accordance with the instant invention.

Now referring to FIGS. 12-30, additional features and processes of the instant invention 10 are shown. With reference to FIG. 12, the law enforcement officer registration is shown. With reference to FIG. 13, an image of the smart card device 10 is shown. In FIG. 14, a diagram of the smart card database list of the smart card device and system 10 is shown. Referring to FIG. 15, there is a perspective view of a 3D model of the smart card device and system 10. In FIG. 16, there is shown a circuit diagram of the RFID connection of the smart card device and system 10 which includes an ESP12e_DEVKIT microchip and RFID. With reference to FIG. 17, there is a diagram of the PCB design module of the RFID connection of the smart card device and system 10. With reference to FIG. 18, a schematic diagram of the reader module of the smart card device and system 10 is shown. In FIG. 19, there is a diagram of the card reader PCB design of the smart card device and system 10. Referring to FIG. 19A, a block diagram of the reader of the smart card device and system 10 is shown. FIG. 20 shows is an illustrative view of the smart card web application dashboard of the smart card device and system in accordance with the instant invention. FIGS. 21-27 show the dashboard screens of the smart card device and system 10 of the instant invention. Referring to FIG. 28, a top and side perspective views of a 3D model of the smart card device and system 10 is shown. With reference to FIG. 29, a schematic of the smart card device and system 10 is shown. With reference to FIG. 30, a printed circuit board of the smart card device and system 10 is shown.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A smart driver card and data management system that allows drivers and officials to access, accumulate and update driver and traffic data, said system comprising:
   a driver card having driver data including driver license data, vehicle registration data and driver insurance data;
   a driver card reader for accessing, reading and transmitting said driver data;
   a microcontroller in communication with said driver card reader;
   driver related code of instructions readable and processable by said microcontroller;
   a central communication device in communication with said microcontroller for receiving, reading and processing said driver data; and
   authority related code of instructions readable and processable by said central communication device in communication with said microcontroller and said driver related code of instructions for accessing, reading and processing said driver data and said traffic data; and
   encryption means, in communication with said driver related code of instructions and said authority related code of instructions, for encrypting said driver data and said traffic data for controlled access to said data.

2. The system of claim 1, further comprising:
   a traffic data receiving, reading and transmitting device for reporting current traffic data.

3. The system of claim 2, further comprising:
   RFID, NFC and MRZ communicating said driver card with said reader; and
   database for storing said driver data and said traffic data.

4. The device of claim 3, further comprising:
   database for storing said driver data.

5. The device of claim 1, further comprising:
   RFID.

6. The device of claim 1, further comprising:
   NFC.

7. The device of claim 1, further comprising:
   MRZ.

8. The system of claim 2, further comprising:
   RFID, NFC and MRZ communicating said driver card with said reader; and
   database for storing said driver data and said traffic data.

9. The system of claim 1, further comprising:
   color QR code.

10. The system of claim 1, further comprising:
    biometrics.

11. The system of claim 1, wherein said driver card comprises an electronic card.

12. The system of claim 1, wherein said driver related code of instructions comprises:
    user registration code for enabling a user with a driver's license to register online;
    a state driving authority registration code of instructions; and
    document verification code of instructions accessible by the driving authority.

13. The system of claim 12, wherein said driver code of instructions further comprises:
    driver data uploading code of instructions; and
    login code of instructions in communication with said authentication means.

14. The system of claim 13, further comprises:
    a mobile communication device accessible and useable by the driver and in communication with said reader;
    mobile communication app readable and processed by said mobile communication device; and
    driver card scanner in communication with said communication app and readable by said mobile communication device.

15. The system of claim 13, wherein said app comprises:
    scanning means for scanning said driver card;
    credentials authorization code of instructions for selectively enabling user access; and
    download means for downloading health insurance document data, driving license document data, vehicle insurance document data, vehicle registration document data and personal health data.

16. The system of claim 14, wherein said driver code of instructions further comprises:
    user registration code of instructions;
    login code of instructions in communication with said user registration code of instructions;
    user authorization code of instructions in communication with said login code of instructions for authorizing access by the user;
    document download code of instructions for downloading driver documents; and
    payment code of instructions for accepting financial payment.

17. The system of claim 16, wherein said authority related code of instructions comprises:
- law enforcement officer login code of instructions in communication with said reader;
- traffic data access code of instructions;
- driver data and traffic data access code of instructions; and
- traffic data upload code of instructions for uploading said driver data and said traffic data.

18. The system of claim 12, wherein said authority related code of instructions comprises:
- law enforcement officer login code of instructions in communication with said reader;
- traffic data access code of instructions;
- driver data and traffic data access code of instructions; and
- traffic data upload code of instructions for uploading said driver data and said traffic data.

19. The system of claim 18, wherein said driver code of instructions comprises:
- driver verification code of instructions for verifying driver data.

20. The system of claim 19, wherein said authority code of instructions comprises:
- officer verification code of instructions for reading and verifying officer related data.

* * * * *